United States Patent [19]

Hasegawa et al.

[11] Patent Number: 5,481,886
[45] Date of Patent: Jan. 9, 1996

[54] COOLING UNIT AND DRAIN CASE FOR AIR CONDITIONERS

[75] Inventors: Etsuo Hasegawa, Kounan; Yoshiharu Kajikawa, Hekinan; Takayuki Morita, Nagoya; Suehiro Okazaki, Kariya; Toshihiro Yamamoto, Gifu; Toshiya Nagasawa, Obu; Shogo Sumi, Toyoake, all of Japan

[73] Assignee: Nippondenso Co., Ltd., Kariya, Japan

[21] Appl. No.: 245,502

[22] Filed: May 18, 1994

[30] Foreign Application Priority Data

| May 19, 1993 | [JP] | Japan | 5-117367 |
| Aug. 27, 1993 | [JP] | Japan | 5-213060 |
| Nov. 5, 1993 | [JP] | Japan | 5-276375 |
| Mar. 16, 1994 | [JP] | Japan | 6-045601 |

[51] Int. Cl.⁶ .................................................. F25D 21/14
[52] U.S. Cl. .................... 62/285; 62/272; 165/913
[58] Field of Search .................... 62/272, 285, 288, 62/289; 165/913

[56] References Cited

U.S. PATENT DOCUMENTS 4,589,265  5/1986  Nozawa.
4,843,835  7/1989  Goetz et al. ............................... 62/288
4,907,420  3/1990  Mahanay et al. ......................... 62/285

FOREIGN PATENT DOCUMENTS 59-137771  8/1984  Japan.
04366395  11/1991  Japan.
587469  4/1993  Japan.

OTHER PUBLICATIONS

Patent Abstract of Japan, vol. 17, No. 244, May 17, 1993, & JP,-A-04 366 395.

Primary Examiner—John M. Sollecito
Assistant Examiner—Susanne C. Tinker
Attorney, Agent, or Firm—Cushman, Darby & Cushman

[57] ABSTRACT

A drain case 4 is disposed between the bottom wall of a unit case and the lower end of refrigerant passage pipes 15 of a stacked type refrigerant evaporator. The drain case 4 is W-shape in cross section, and comprising two pieces of outside inclined walls 32 contacting the side ends of two pieces of tank parts 16 and 17 formed at the lower end side of the refrigerant passage pipes 15, a chevron type protruded wall 33 contacting a recessed part 28 formed at the bottom end of the part between the adjacent two pieces of tank parts 16 and 17, and inside inclined walls 34 having a drain hole 36. In this arrangement, the condensed water flows from the side ends of the two pieces of tank parts 16 and 17 and the part between the two pieces of tank part 16 and 17 into the lower ends thereof reaches the two pieces of outside inclined walls 32 and protruded wall 33 of the drain case 4 before reaching the bottom end of the two pieces of tank parts 16 and 17, and then is efficiently drained therefrom. Localized corrosion that may occur at the lower end part of refrigerant passage pipes is prevented by not allowing the condensed water to stay at the lower end side of the refrigerant passage pipes.

13 Claims, 31 Drawing Sheets

COOLING UNIT AND DRAIN CASE FOR AIR CONDITIONERS

BACKGROUND OF THE INVENTION

1. Field of the Invention

The present invention generally relates to such a cooling unit for air conditioners that is furnished with a drain case suitable for efficiently draining the condensed water generated on the surface of a refrigerant evaporator housed within a unit case, by way of examples. More particularly, the present invention is related to the drain case for the cooling unit for air conditioners.

2. Description of the Related Art

As illustrated in FIGS. 26 and 27, there has conventionally been an air conditioner which houses a refrigerant evaporator 102 within a recessed part 101 of a unit case 100 serving as a duct for sending the air into a vehicle compartment. In this air conditioner, a drain port 103 is formed at the bottom wall part of the recessed part 101, which drain port 103 being opened under the refrigerant evaporator 102, to drain the condensed water adhered to the surface of the refrigerant evaporator 102 from the unit case 100 to outside.

On the other hand, as illustrated in FIG. 28, the refrigerant evaporator 102 has been composed by stacking a plurality of plural pairs of formed plates 106 with which refrigerant passage pipes 104 and two pieces of tank parts 105 are integrally formed at the end part side of the refrigerant passage pipes 104. A core part 107 of the refrigerant evaporator 102 is so composed that fins 108 are disposed between the adjacent refrigerant passage pipes 104.

The air side heat transmission surface of the refrigerant evaporator 102 (the surface to which the condensed water adheres) is formed from the surfaces of the fins 108 and the surfaces of the refrigerant passage pipes 104. As illustrated in FIG. 29, the condensed water adhered to the surface of the fins 108 flows along the fins 108 to the side of the refrigerant passage pipes 104. On the other hand, as illustrated in FIG. 30, a plurality of inclined ribs 109 are formed in the protruded state at the inside of the refrigerant passage pipes 104 (in the recessed state at the air side heat transmission surface) to improve the heat transmission efficiency. The condensed water flows along the inclined ribs 109 to the lower end side of the core part 107. Based on the principle of draining the condensed water as described in the above, the condensed water adhered to the surfaces of the fins 108 and refrigerant passage pipes 104 is drained to the lower end side of the core part 107. Incidentally, a folded part 113 prevents the fins 108 from buckling.

There are two types of surface treatments for refrigerant passage pipes 104 formed by a pair of plates 106 and the fins 108; one is hydrophilic treatment, and the other is water repellent treatment. Hitherto, the hydrophilic treatment has generally been employed for two reasons; there has been no water repellent treatment liquid which can withstand the operational environment of the refrigerant evaporator 102, and when the water repellent treatment is applied to the surface of the refrigerant passage pipes 104 and fins 108, water drops are generated on the surfaces of the refrigerant passage pipes 104 and fins 108. As illustrated in FIG. 31, when the fins 108 are provided with louvers 110, the water drops may be repelled by and between the louvers 110 and stay there or may not flow downwards from the surfaces of the fins 108 but may splash towards the lee side of the unit case 100.

When the hydrophilic treatment is applied to the surfaces of the refrigerant passage pipes 104 and fins 108, water films are formed on the surfaces of the refrigerant passage pipes 104 and fins 108, which serves to supplement the above-described draining principle. As a result, there is no excessive stay of the condensed water, though a water film of approximately 0.1 mm in thickness is formed at the upper end side of the core part 107 due to the effects of the hydrophilic treatment. In the refrigerant evaporator 102 including two pieces of tank parts 105 as illustrated in FIG. 26 at the upper end side of each refrigerant passage pipe, even if the condensed water stays at the lower end part of the refrigerant passage pipes 104, corrosion which may occur at the lower end side of the refrigerant passage pipes 104 is not so significant due to the effects of the sacrificially corroded fins 108.

However, in the refrigerant evaporator 102 in which two pieces of tank parts 105 illustrated in FIG. 27 are formed at the lower end side of the refrigerant passage pipes 104, as there is no fin 108 provided at the lower end side of the refrigerant passage pipes 104 where the condensed water stays, there would be no effect of the sacrificially corroded fins 108. For this reason, localized corrosion which may occur at the lower end side of the refrigerant passage pipes 104 due to the stay of the condensed water is importantly pointed out.

In other words, as illustrated in FIGS. 32 and 33, at the lower end side of the core part 107 or tank parts 105 of the conventional refrigerant evaporator 102, there has been a problem that the drainage of the condensed water adhered to the surfaces of the refrigerant passage pipes 104 and fins 108 is so low that the condensed water stays there. Furthermore, when the refrigerant evaporator 102 in this arrangement is inserted into the unit case 100, the drainage of the refrigerant evaporator 102 is worsened by the water contained in an insulator 111 disposed between the unit case 100 and the lower end part of the refrigerant evaporator 102, by way of examples.

The reason for the above is, as illustrated in FIG. 34, the condensed water flowed from the lee side end part A of the lower end parts of the two pieces of tank parts 105 easily flows along the unit case 100 into a drain port 103, while the condensed water flowed from the windward side end part B of the lower end parts of the two pieces of tank parts 105 bridges the clearance between the lower end parts of the tank parts 105 and the insulator 111 and stays there (water stay part 112).

When the condensed water flowed from the lower end part center C between the two pieces of tank parts 105 flows to the windward side end part B side of the lower end parts of the two pieces of tank parts 105, the condensed water joins the water drops in bridging and is held at the stay part 112. Alternatively, when the same condensed water flows to the lee side end part A side of the lower end parts of the two pieces of tank parts 105, the condensed water stays at the stay part 114 due to no guiding means available into which the condensed water falls.

In the water drops staying at the stay parts 112 and 114, (water retention force due to surface treatment)+ (structural difficulty in dropping of water drops)>(gravity on water drops) is established. Therefore, the water drops are held at the stay parts 112 and 114, and drops downwards as the water drops grow.

As described in the above, in the refrigerant evaporator 102 in which the two pieces of tanks 105 are formed at the lower end side of the refrigerant passage pipes 105, there has been a problem that the condensed water easily stays and localized corrosion is easily occur at the lower end side of the refrigerant passage pipes 104 where corrosive elements (Cl, NOx, etc.) in the atmosphere are easily condensed.

SUMMARY OF THE INVENTION

An object of the present invention is to provide a cooling unit and drain case for an air conditioner which can prevent localized corrosion which may occur at the lower end side of refrigerant passage pipes of a refrigerant evaporator with mainly two pieces of tank parts formed at the lower end side of the refrigerant passage pipes by preventing the stay of the condensed water at the lower end side of the refrigerant passage pipes.

A preferable embodiment of the present invention employs a technical means including a plurality of stacked refrigerant passage pipes with two pieces of tank parts formed at the lower end side of the refrigerant passage pipes, a refrigerant evaporator composed of fins disposed between the adjacent refrigerant passages, a windward side inclined parts contacting the windward side end parts of the two pieces of tank parts, lee side inclined parts contacting the lee side end parts of the two pieces of the tank parts, a protruded part contacting the lower end part of the part between the two pieces of tank parts, and a drain case with a drain hole for draining the condensed water generated by the refrigerant evaporator.

The drain case may be composed of two pieces of side wall parts contacting the windward side ends and lee side ends of the two pieces of tank parts, two pieces of outside inclined walls forming the windward side inclined parts and lee side inclined parts, a chevron type protruded wall contacting the lower end part of the part between the two pieces of tank parts and forming the protruded part, and two pieces of inside inclined walls connecting the two pieces of outside inclined walls and the protruded wall. Furthermore, the drain hole may be made at the inside inclined wall.

The drain case may also be composed of two pieces of side wall parts contacting the windward side ends and lee side end of the two pieces of tank parts, two pieces of inclined walls forming the windward side inclined parts and the lee side inclined parts, and a pillar type wall extended upwards from the connecting part of the inclined walls, contacting the lower end part of the part between the two pieces of tank parts and forming the protruded part.

Furthermore, the drain case may also be composed of two side walls contacting the windward side ends and lee side ends of the two pieces of tank parts, two inclined walls forming the windward side inclined parts and the lee side inclined parts, the bottom wall part connecting the bottom ends of these inclined walls to each other and separated from the lower end parts of the two pieces of tank parts by the specified distance, and a pillar type wall extended upwards from the center of this bottom wall, contacting the lower end part of the part between the two pieces of tank parts and forming the protruded part. The drain hole may also be made at the bottom wall part.

Hydrophilic treatment may be applied to the formed plate and fins of the refrigerant evaporator. The bottom ends of the presence of the fins between the adjacent formed plates may be disposed under the upper end of the drain case. Furthermore, an engagement part for positioning the drain case may be provided in the unit case by disposing the drain case between the lower end of the refrigerant evaporator and the bottom wall of the unit case.

The present invention in preferred mode employs a technical means including a refrigerant evaporator with tank parts bulged outwards from the other parts at the lower end side of refrigerant passage pipes to the surfaces of which hydrophilic treatment is applied, and a unit case having a drain port for draining the condensed water under the refrigerant evaporator, whereas either of the refrigerant evaporator or the unit case has a guiding means for guiding the condensed water from the bottom ends of the tank parts or the side ends of the tank parts into the drain port.

The present invention in another preferred mode employs a drain case disposed under a refrigerant evaporator composed of plural pairs of formed plates forming two pieces of tank pars at the lower end side of the refrigerant passage pipes to drain the condensed water generated by the refrigerant evaporator, and employs a technical means including windward side inclined parts contacting the windward side end parts of the two pieces of tank parts, lee side inclined parts contacting the lee side parts of the two pieces of tank parts, a protruded part contacting the lower end part of the part between the two pieces of tank parts, and a drain hole for draining the condensed water generated by the refrigerant evaporator.

The condensed water generated on the surface of the refrigerant evaporator with the two tank parts formed at the lower end of the refrigerant passage pipe falls due to gravity to the windward side end parts of the two pieces of tank parts, to the lee side end parts of the two pieces of tank parts, and to the lower end part of the part between the two pieces of tank parts. The condensed water reached the windward side end parts of the two pieces of tank parts flows along the windward side inclined parts into the drain case and then is drained from the drain hole. The condensed water reached the lee side end parts of the two pieces of tank parts flows along the lee side inclined parts into the drain case and then is drained from the drain hole. Furthermore, the condensed water reached the lower end of the part between the two pieces of tank parts flows along the protruded part into the drain case and then is drained from the drain hole. In this arrangement, the condensed water can not stay at the bottom ends of the two pieces of tank parts, and therefore localized corrosion which may occur at the lower end side of the refrigerant passage pipes can be prevented.

In other preferred mode in the present invention, the condensed water generated on the surface of the refrigerant evaporator with the tank parts formed at the lower end side of the refrigerant passage pipes provided with hydrophilic treatment falls due to gravity. Then, the condensed water flows from the bottom end or side ends of the tank parts into the guiding means and then is drained into the drain port of the unit case. In this arrangement, the condensed water can not stay at the bottom end of the tank parts, and therefore localized corrosion which may occur at the lower end side of the refrigerant passage pipes can be prevented.

DETAILED DESCRIPTION OF THE EMBODIMENTS

A plurality of preferred embodiments of a cooling unit for air conditioners according to the present invention will now be described with reference to FIGS. 1 to 26 inclusive.

[Composition of the First Embodiment]

Figure 1:
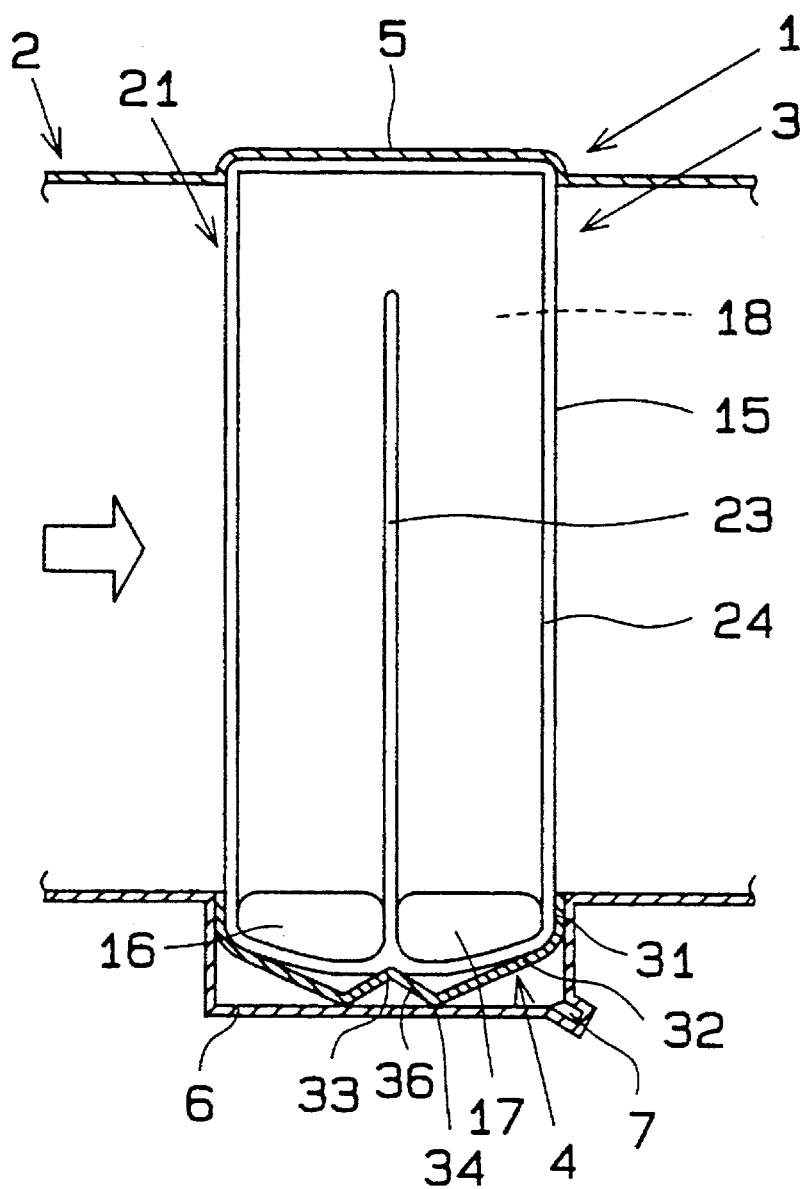
FIG. 1 is a cross-sectional view illustrating the first embodiment according to the present invention.

FIGS. 1 to 4 illustrate the structure of the first embodiment according to the present invention, whereas FIG. 1 illustrates a cooling unit for air conditioners for use in automobiles. The cooling unit 1 is provided with a unit case 2 constituting a duct for leading the air into the vehicle compartment, a stacked type refrigerant evaporator 3 for cooling the air flowing through the unit case 2, and a drain case 4 disposed between the unit case 2 and the stacked type refrigerant evaporator 3.

The unit case 2 is cylindrically shaped, made of polypropylene (PP), for example, and has a top wall 5 recessed upwards at the top part and a bottom wall 6 recessed downwards and at the bottom part facing the top wall 5. The bottom wall 6 is inclined downwards with respect to the horizontal direction, and includes a drain port 7 at the bottom part thereof for draining the condensed water from the inside of the unit case 2 to the outside thereof.

Figure 2:
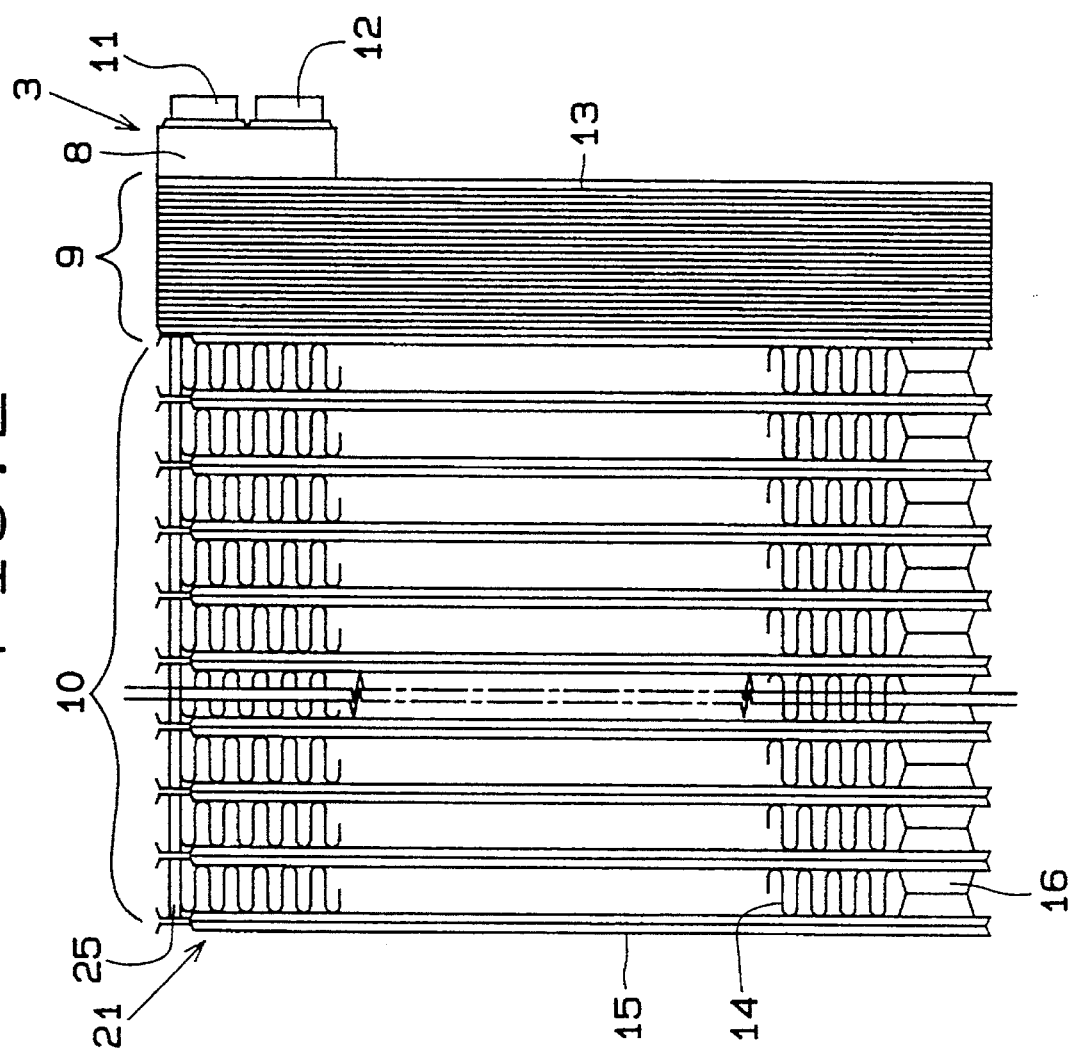
FIG. 2 is a front view illustrating the stacked type refrigerant evaporator utilized for the first embodiment according to the present invention.
Figure 3:
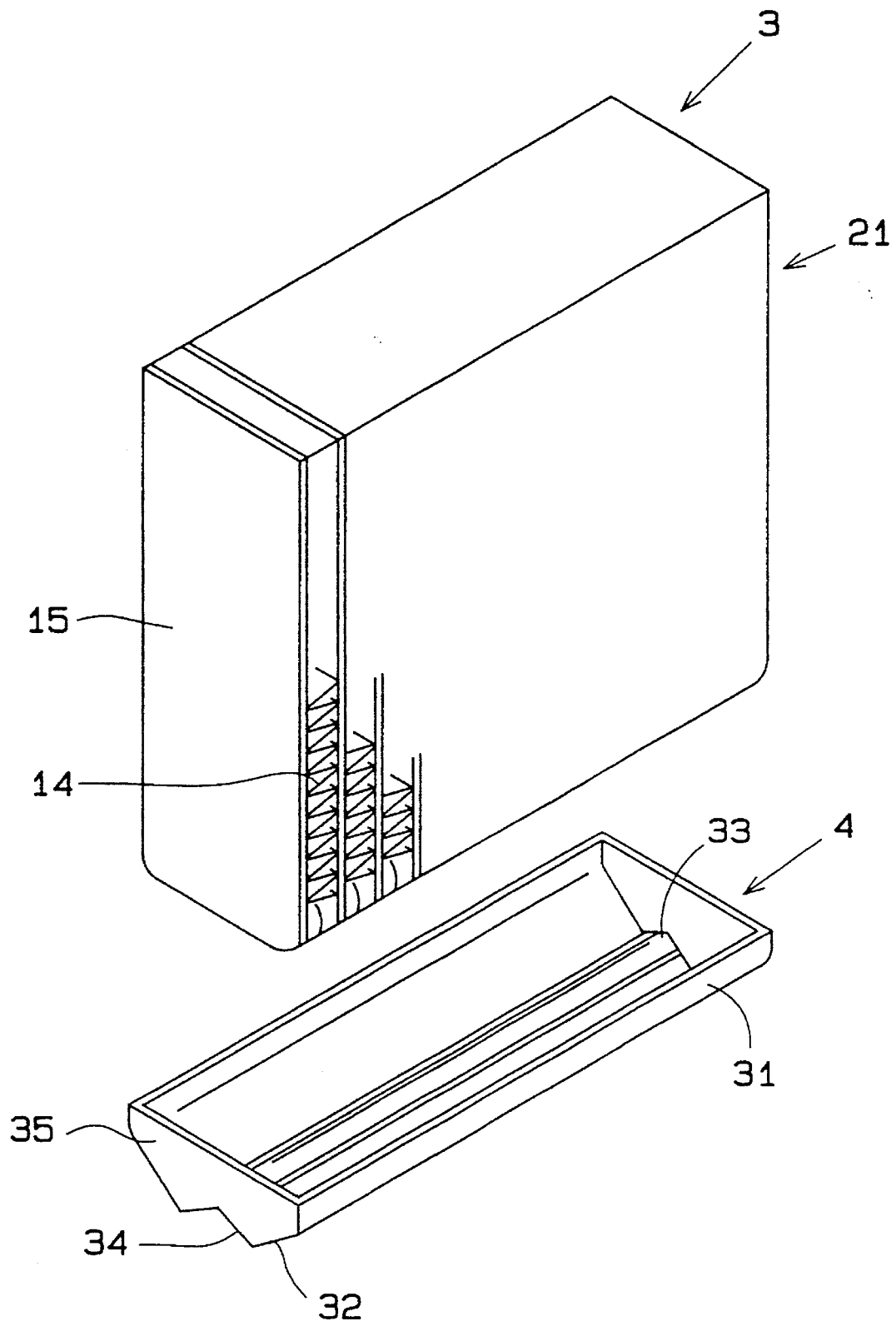
FIG. 3 is a perspective view illustrating the stacked type evaporator and drain case utilized for the first embodiment according to the present invention.

FIG. 2 illustrates the stacked type refrigerant evaporator 3, while FIG. 3 illustrates the stacked type refrigerant evaporator 3 and the drain case 4. The stacked type refrigerant evaporator 3 comprises a joint block 8 for the connection thereof to the downstream side of an expansion valve (not illustrated) and also for the connection thereof to a refrigerant compressor (not illustrated), a refrigerant-refrigerant heat exchange part 9 for making heat exchange between two different flows of the refrigerant, a refrigerant-air heat exchange part 10 for making heat exchange between the refrigerant and the air, and a pressure reducing part (not illustrated) disposed between the refrigerant-refrigerant heat exchange part 9 and the refrigerant-air heat exchange part 10.

The joint block 8 includes an inflow port 11 for permitting the refrigerant in the gas-liquid two phase state flowed out of the expansion valve to flow into the inside of the stacked type refrigerant evaporator 3, and an outflow port 12 for permitting the refrigerant to flow from the stacked type refrigerant evaporator 3 to the refrigerant compressor side after being subjected to heat exchange.

The refrigerant-refrigerant heat exchange part 9 comprises a plurality of stacks of refrigerant passage pipes 13, each of which being composed of a pair of thin flat formed plates formed by brazing or other means, and the surfaces of the pair of formed plates are coated with a precoat material (C513), a hydrophilic polymeric material or a hydrophilic porous material as a hydrophilic treatment.

The inside of the refrigerant-refrigerant heat exchange part 9 is so formed that an inlet side refrigerant passage (not illustrated) for feeding the refrigerant from the inflow port 11 to the refrigerant-air heat exchange part 10 and an outlet side refrigerant passage (not illustrated) for feeding the refrigerant from the refrigerant-air heat exchange part 10 into the outflow port 12 meander therethrough. The inlet side refrigerant passage and the outlet side refrigerant passage are disposed in proximity to each other over the specified distance so that heat exchange can be made between the refrigerant flowing through the inlet side refrigerant passage and the refrigerant flowing through the outlet side refrigerant passage.

The refrigerant-air heat exchange part 10 comprises a plurality of stacks of corrugated fins 14 and refrigerant passage pipes 15, whereas the corrugate fins 15 function for improving the refrigerant-air heat exchange efficiency and the refrigerant passage pipes 15 are formed by brazing or other means. The surfaces of the corrugated fins 14 and the pair of formed plates are coated with a precoat material (C513), a hydrophilic polymeric material or a hydrophilic porous material as a hydrophilic treatment.

Figure 4:
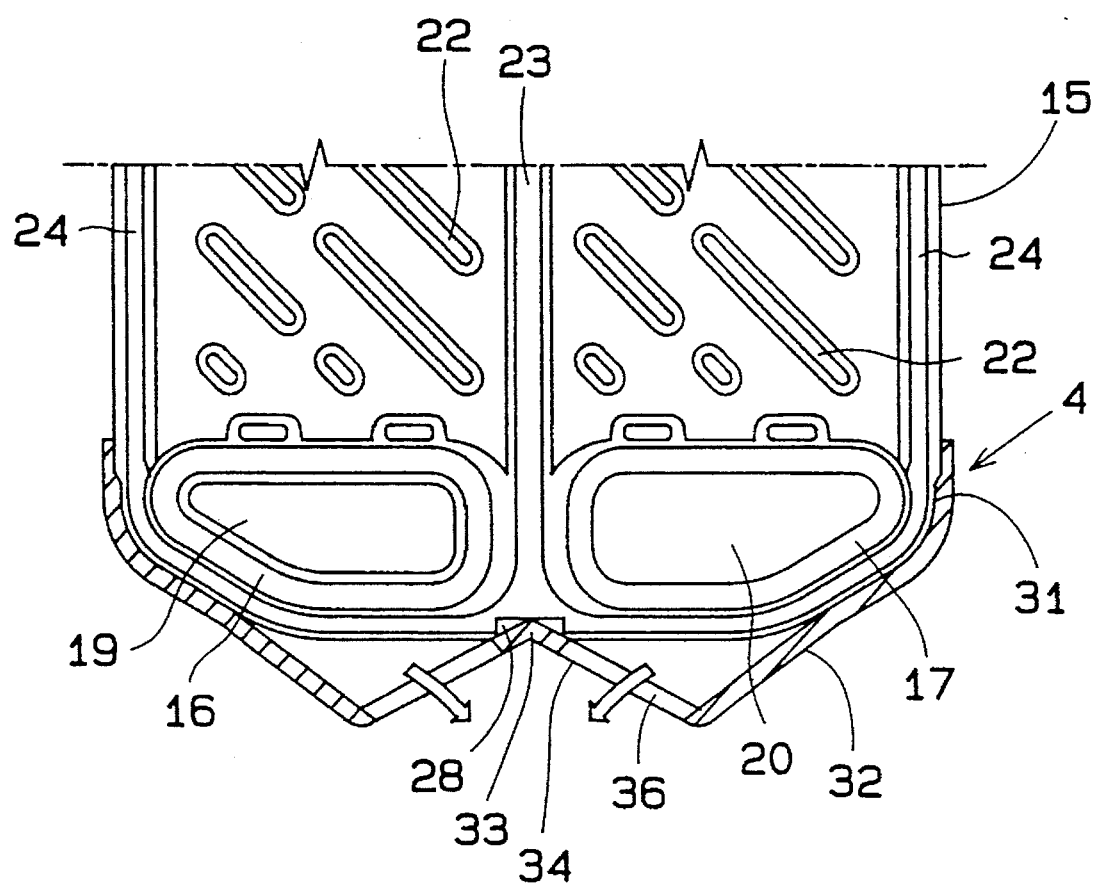
FIG. 4 is an illustrative view illustrating the principle of the draining of the first embodiment according to the present invention.

As partly illustrated in FIG. 4, the formed plate forming the refrigerant passage pipe 15 is formed by pressing a thin aluminum alloy plate. A tank part 16 is formed on the windward at the lower end of the refrigerant passage pipe 15, while a tank part 17 is formed on the lee side at the lower end of the refrigerant passage pipe 15. The two pieces of tank parts 16 and 17 formed at the lower ends of the refrigerant passage pipes 15 are connected with each other through a roughly U-shaped refrigerant evaporation passage 18 formed thereabove, and bulged to be roughly bowl-shaped in the direction of stacking so as to be joined by brazing or other means at the lower ends of the adjacent refrigerant passage pipes 15. Furthermore, link holes 19 and 20 which are roughly elliptic are formed at the two pieces of tank parts 16 and 17 to link the two pieces of tank parts 16 and 17 to the adjacent refrigerant passage pipes 15.

The refrigerant evaporation passage 18 of a plurality of the refrigerant passage pipes. 15 form a core part 21 of the stacked type refrigerant evaporator 3 together with a plurality of the corrugated fins 14. The refrigerant evaporation passage 18 includes a numerosity of inclined ribs 22 which are formed so as to protrude towards the inside thereof. On the other hand, joint walls 23 and 24 are formed at the central part and outer periphery of the refrigerant passage pipes 15 so as to protrude towards the inside thereof as a means for joining the pair of formed plates to each other by brazing or other means. Furthermore, a fold part 25 for preventing the buckling of the corrugated fins 14 extends from the top end of one of the pairs of formed plates in the direction of stacking of the refrigerant passage pipes 15.

The drain case 4 is a guiding means according to the present invention. As illustrated in FIGS. 3 and 4, the drain case 4 is made of PP, for example, and W-shaped in cross sectional, and disposed between the bottom wall 6 of the unit case 2 and the lower end of the stacked type refrigerant evaporator 3. This drain case 4 is designed to guide the condensed water generated over the surface of the stacked type refrigerant evaporator 3 from the bottom end center of the refrigerant passage pipes 15 (13) and the side ends of the two tank parts 16 and 17 (the windward side end and lee side end of the stacked type refrigerant evaporator 3) into the drain port 7 of the unit case 2.

This drain case 4 comprises two pieces of side wall parts 31, two pieces of outside inclined walls 32, a chevron type protruded wall 33, two pieces of inside inclined walls 34, and two pieces of closing wall 35 for closing the width ends of these walls 31, 32, 33 and 34. The two pieces of side walls 31 are arc-shaped in cross section, and serves as a means for preventing air leakage at the lower end of the stacked type refrigerant evaporator 3 by closing the side ends of the two pieces of tank parts 16 and 17 formed at the lower end of the refrigerant passage pipes 15 (13). The inside surfaces of the two pieces of side wall parts 31 contact the side ends of the two pieces of tank parts 16 and 17, and the outside surfaces thereof contact the inside surfaces of the bottom wall 6 of the unit case 2.

In the two pieces of outside inclined walls 32, the outside inclined wall 32 on the windward is a side inclined part on the windward according to the present invention, while the other outside inclined wall 32 on the lee is a side inclined part on the lee according to the present invention. The two pieces of outside inclined walls 32 are inclined downwards from the lower ends of the two pieces of side wall parts 31, and the bottom ends thereof contact the bottom surface of the bottom wall 6 of the unit case 2. The protruded wall 33 is a protruded wall according to the present invention, and contacts a squarely recessed part 28 formed at the central bottom end of the refrigerant passage pipe 15 (13). The recessed part 28 is formed at the bottom end of the part between the adjacent two pieces of tank parts 16 and 17. The two pieces of inside inclined walls 34 are parts connecting the outside inclined walls 32 and the protruded wall 33, and include drain ports 36 respectively. The drain ports 36 are drain ports according to the present invention, and formed so as to be inclined and open at the bottom end of the drain case 4.

[Mode of Operation of the First Embodiment]

Figure 5:
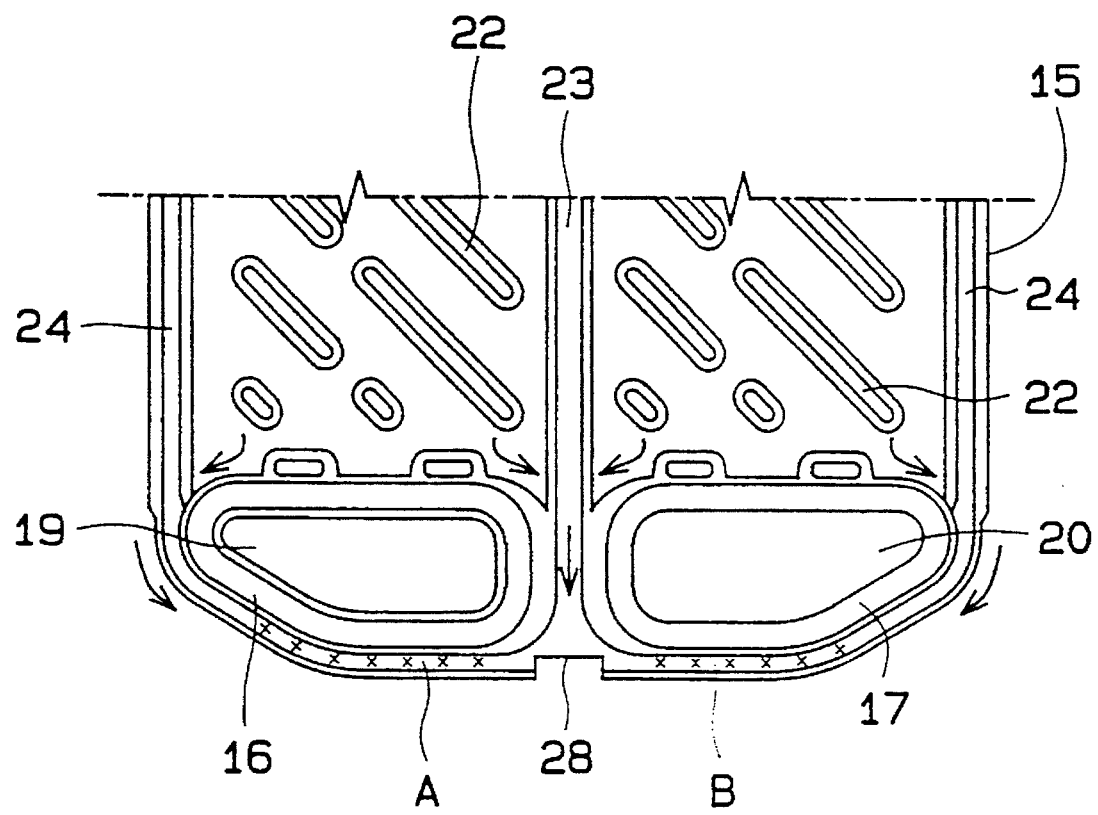
FIG. 5 is an illustrative view illustrating the principle of the draining of the first comparative example.
Figure 6:
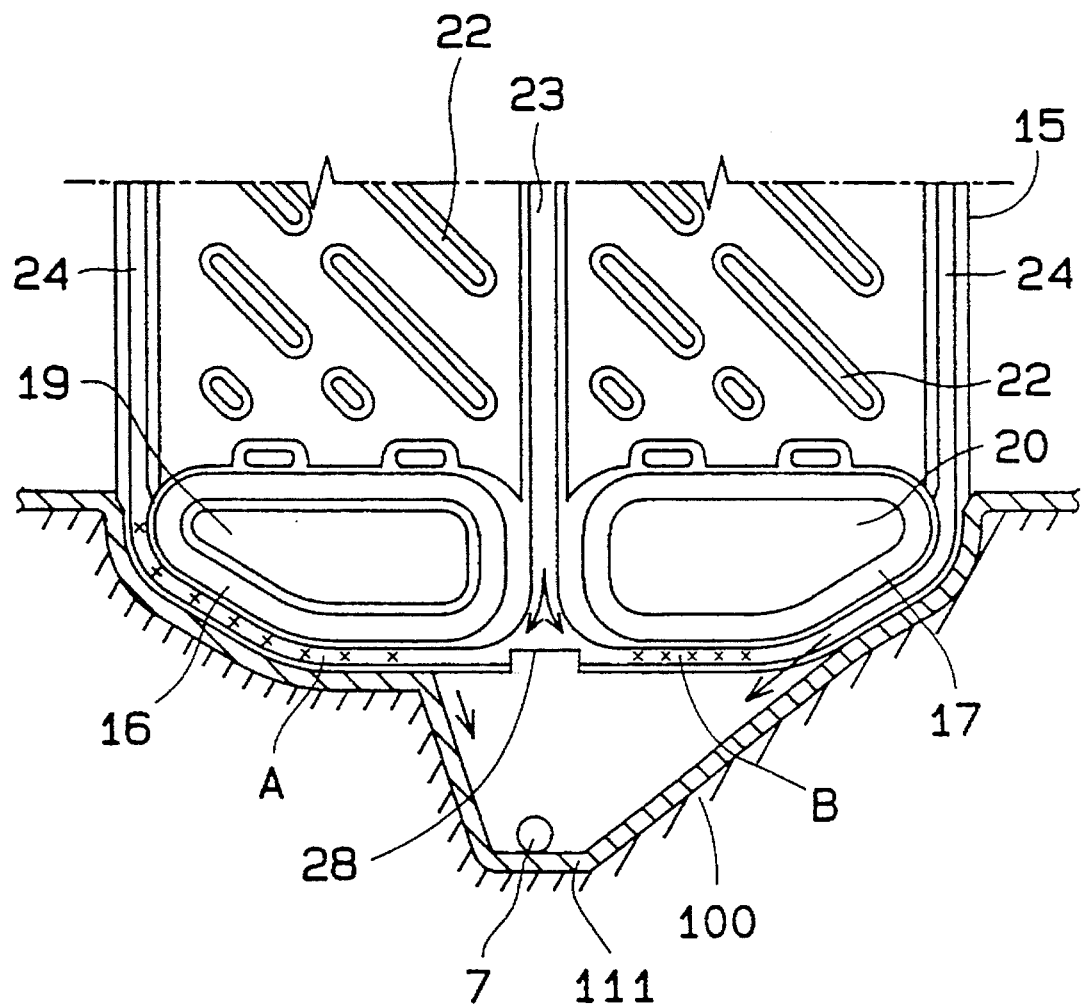
FIG. 6 is an illustrative view illustrating the principle of the draining of the second comparative example.

The mode of operation of the first embodiment will now be described referring to FIGS. 1 to 6. FIG. 4 illustrates the principle of draining the condensed water according to an art in which the drain case 4 is contacted to the lower end of the stacked type refrigerant evaporator (first embodiment). FIG. 5 illustrates the principle of draining the condensed water according to an art in which the drain case 4 is not disposed at the lower end of the stacked type refrigerant evaporator 3 (first comparative example). FIG. 6 illustrates the principle of draining the condensed water according to an art in which a conventional unit case 100 is disposed under the stacked type refrigerant evaporator 3 (second comparative example).

The stacked type refrigerant evaporator 3 with the surfaces of the corrugated fins 14 and refrigerant passage 15 provided with hydrophilic treatment cools the air by having the air flowing through the unit case 2 and the refrigerant flowing through the refrigerant passage pipe 15 make heat exchange with each other. When the air is cooled by the stacked type refrigerant evaporator 3 to be below the dew point, the moisture contained in the air is condensed and adheres to the surfaces of the corrugated fins 14 and refrigerant passage pipe 15, forming a water film of approximately 0.1 mm thick over the surfaces.

The condensed water adhered to the surfaces of the corrugated fins 14 flows along the corrugated fins 14 to the refrigerant passage pipe 15, while the condensed water adhered to the surfaces of the refrigerant passage pipe 15 falls along the inclined ribs 22 and the joint walls 23 and 24, both of which being recessed from the other part of the refrigerant passage pipes. In the case of the first comparative example as illustrated in FIG. 5, the condensed water flowed from the side ends of the two pieces of tank parts 16 and 17 of the refrigerant passage pipes 15 and from between the two pieces of tank parts 16 and 17 into the lower end sides of the two pieces of tank parts 16 and 17 stays at the lower ends A and B (horizontal parts) of the two pieces of tank parts 16 and 17, due to no drain case 4 or guiding means available therefrom.

In the case of the second comparative example as illustrated in FIG. 6, the condensed water flowed from the side end of the tank part 17 into the lower end side thereof easily flows along the bottom wall of the unit case 100, while the condensed water flowed from the side end of the tank part 16 bridges the clearance between the tank part 16 and an insulator 111 in a form of water drops, and, as a result, stays at the lower end A (horizontal part) of the tank part 16. When the condensed water flowed from between the two pieces of tank parts 16 and 17 into the lower end side of the tank parts 16 and 17 flows into the lower end side of the tank part 16, the condensed water joins the bridging water drops and stays there being held by the bridging water drops. When the condensed water flowed into the lower end side of the tank 17, the condensed water stays at the lower end B (horizontal part) of the tank part 16, due to no guiding means available therefrom.

In contrast with the above examples, when the drain case 4 which is W-shape in cross section is arranged so as to contact the lower end of a plurality of the refrigerant passage pipes 15, as illustrated in FIG. 4, the condensed water flowed from the side end of the tank part 16 and the side end of the tank part 17 flows to the side wall parts 31 of the drain case 4 before reaching the lower ends of the tank parts 16 and 17, and guided from the side wall parts 31 to the outside inclined walls 32, to the drain holes 36, to the bottom wall 6, and then to the drain port 7, and then efficiently drained therefrom.

The condensed water flowed from between the lower ends of the two pieces of tank parts 16 and 17 into the lower end sides of the tank parts 16 and 17 flows to the protruded wall 33 of the drain case 4 before reaching the lower ends of the tank parts 16 and 17, and is guided from the protruded wall 33 to the inside inclined wall 34, to the drain holes 36, to the bottom wall 6, and to the drain port 7, and then efficiently drained therefrom.

[Effect of the First Embodiment]

Figure 7:
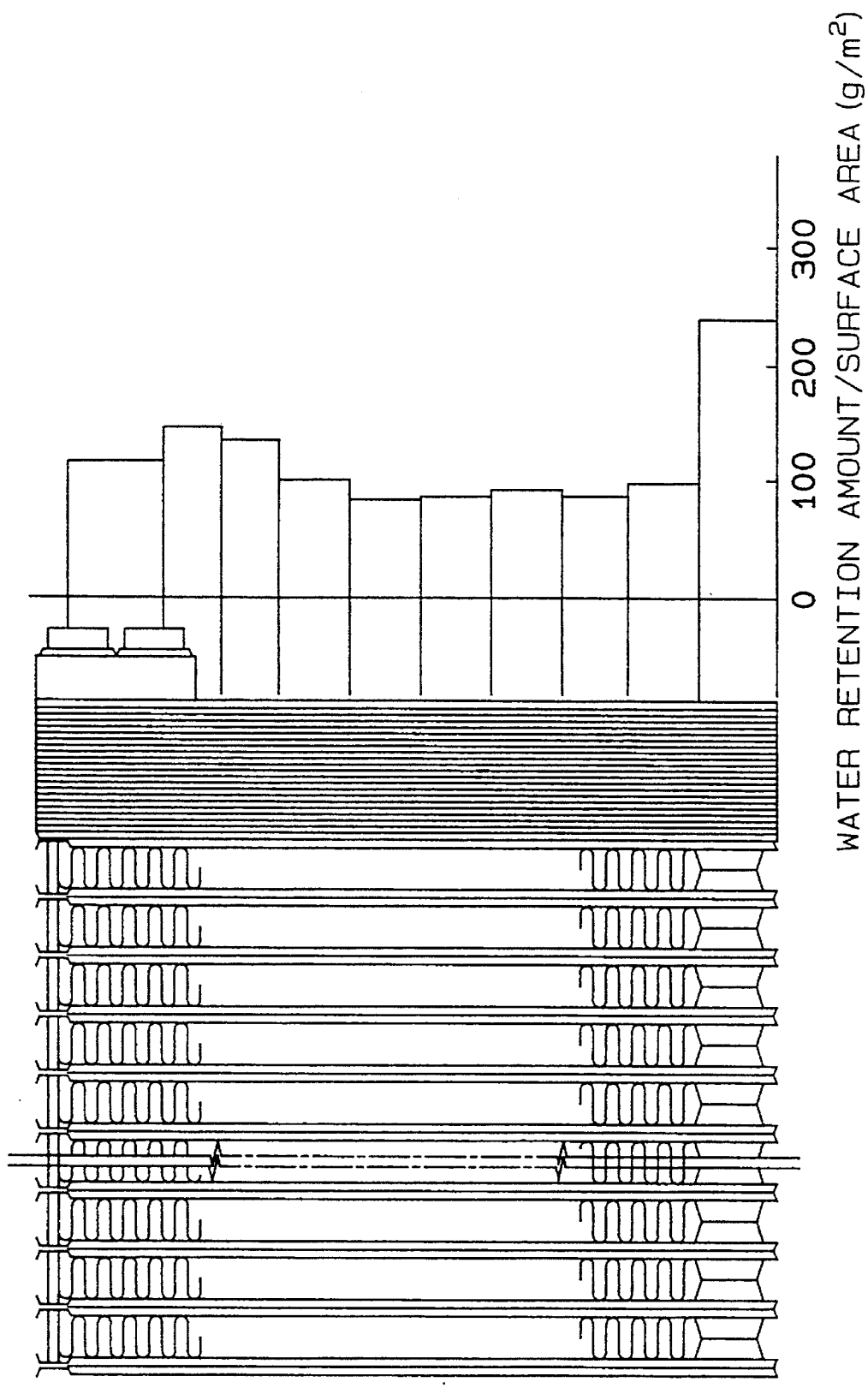
FIG. 7 is a graph illustrating the experimental data of the first comparative example.
Figure 8:
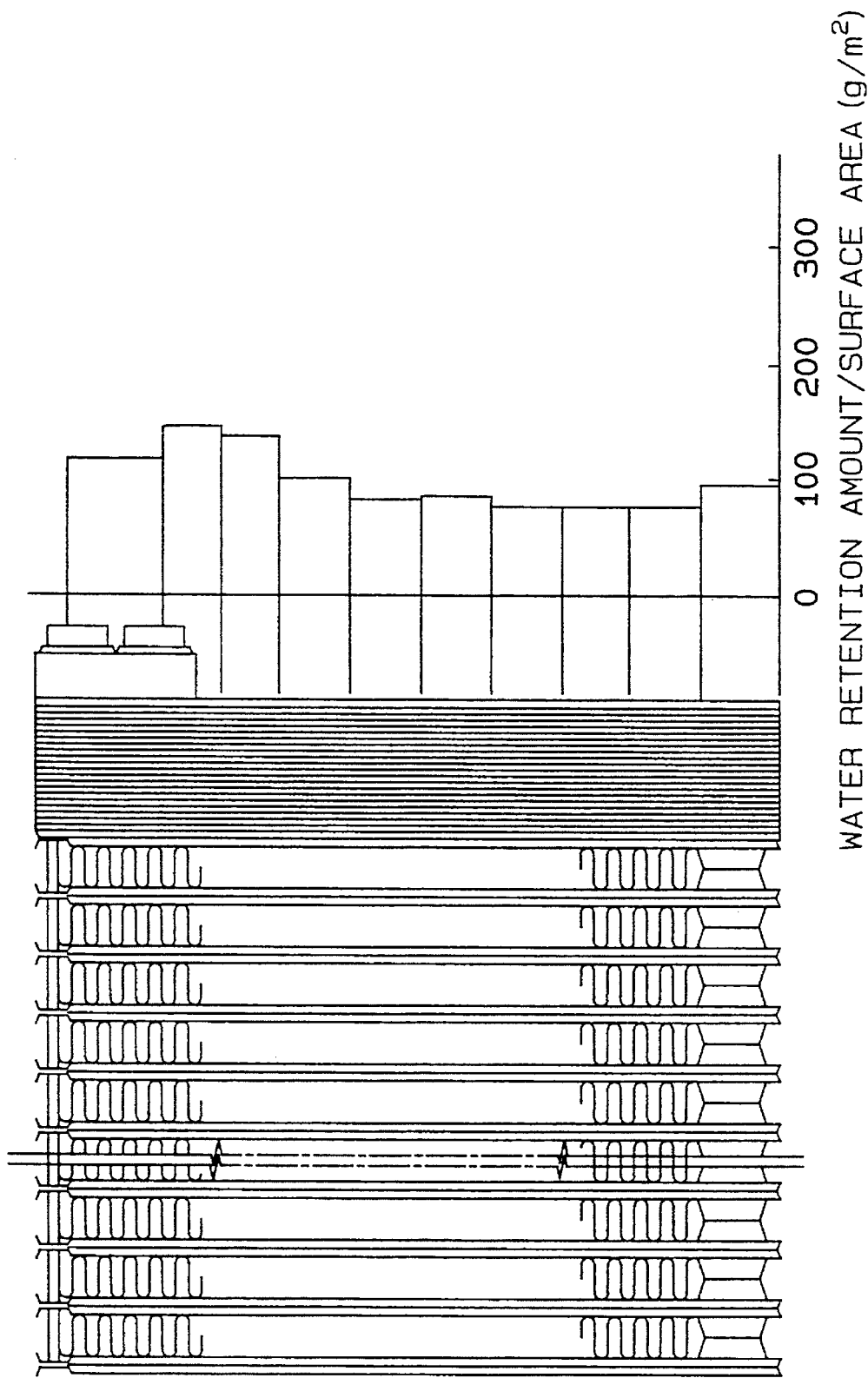
FIG. 8 is a graph illustrating the experimental data of the first embodiment according to the present invention.

FIGS. 7 and 8 illustrates experimental data of (water retention amount)/(surface area) at each part of the first and second comparative examples in the vertical direction. It can be understood from FIG. 7 that, in the first comparative example, there is the localized stay of the condensed water at the lower ends A and B of the tank parts 16 and 17. In contrast, it can be understood from FIG. 8 that, in the second comparative example, the localized stay of the condensed water is restrained, and therefore, the localized corrosion that may be caused to the lower end side of the refrigerant passage pipes 15 (13) due to some corrosive elements (Cl, NOx, etc.) can be restrained.

[Composition of the Second Embodiment]

Figure 9:
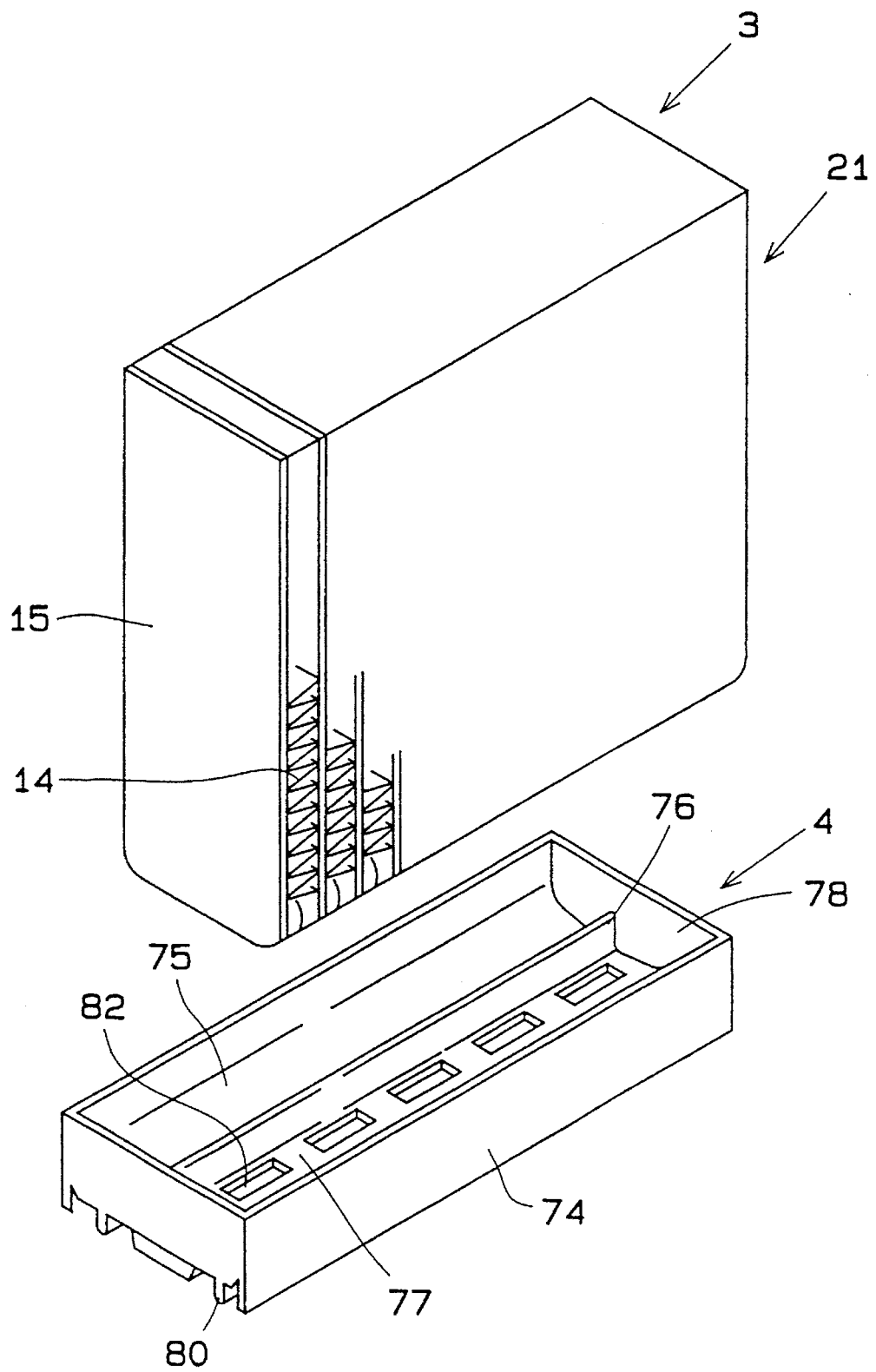
FIG. 9 is a perspective view illustrating the stacked type refrigerant evaporator and drain case utilized for the second embodiment according to the present invention.
Figure 10:
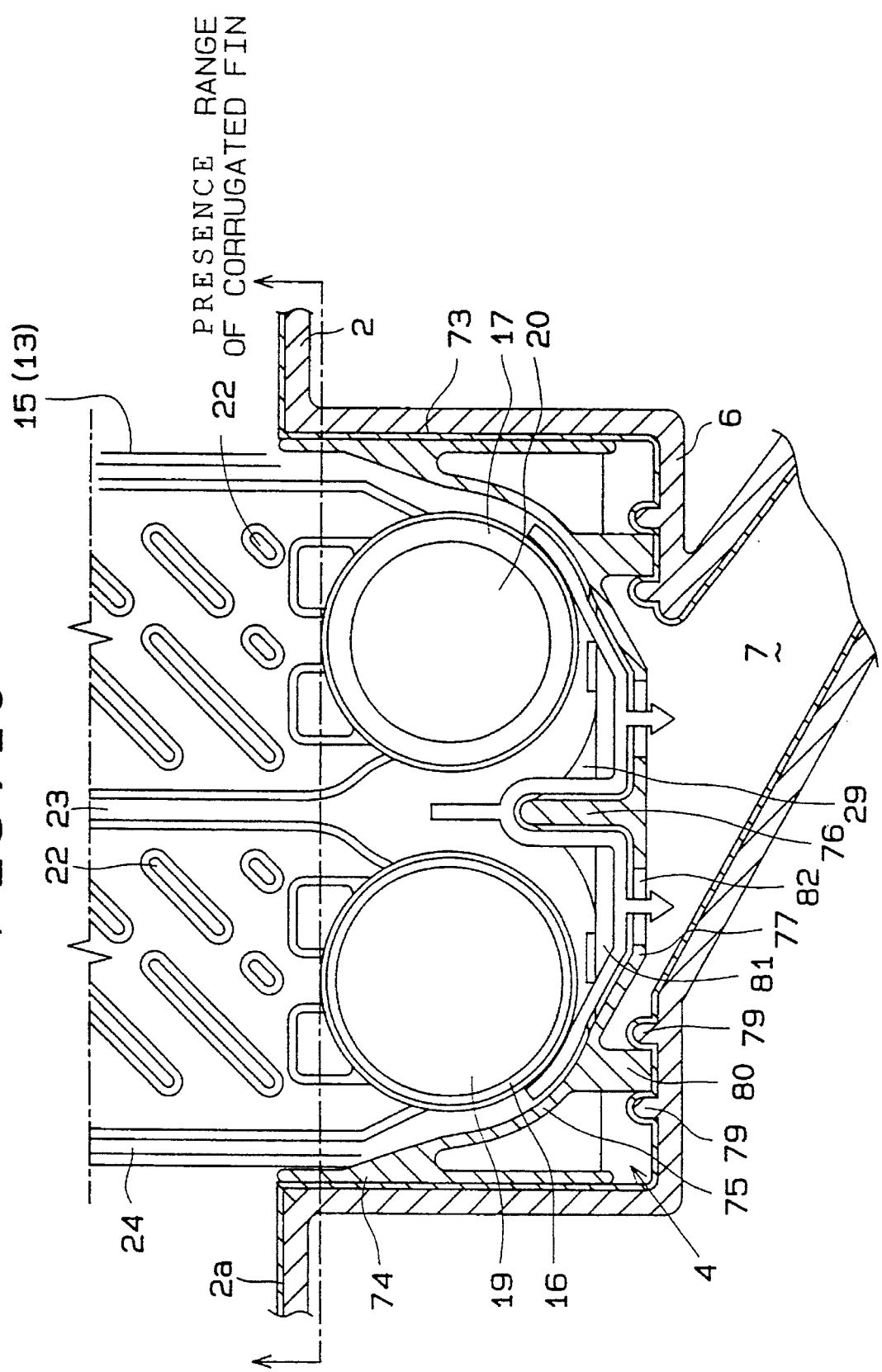
FIG. 10 is a cross-sectional view illustrating the stacked type refrigerant evaporator and drain case utilized for the second embodiment according to the present invention.

FIGS. 9 and 10 illustrate the structure of the second embodiment according to the present invention, particularly the structure of the stacked type refrigerant evaporator and drain case thereof.

Round through holes 19 and 20 are formed in the two pieces of tank parts 16 and 17 formed at the lower end side of formed plate composing the refrigerant passage pipes 15 of the stacked type refrigerant evaporator 3 of this embodiment to link the two pieces of tank parts 16 and 17 to the adjacent refrigerant passage pipes 15. The corrugated fins 14 disposed between the adjacent refrigerant passage pipes 15 are joined from the upper ends of the two pieces of tank parts 16 and 17 to the upper sides thereof by brazing or other means as illustrated by an alternate long and short dash line in FIG. 10.

The drain case 4 of this embodiment is disposed between the bottom wall 6 of the unit case 2 and the lower end of the stacked type refrigerant evaporator 3 through an insulator 73 made of styrene paper or PE-lite.

This drain case 4 comprises two pieces of upright wall parts 74 disposed in parallel with each other, two pieces of arc walls 75 inclined downwards from the upright walls 74 respectively, a comparatively long protruded wall 76 contacting groove parts 29 formed at the central bottom end of the refrigerant passage pipes 15 (13), two rows of bottom walls 77 connecting the arc walls 75 and the protruded wall 76 respectively, and closing walls 78 for closing the width ends of these walls 74, 75, 76 and 77.

The outside surfaces of the two pieces of upright wall parts 74 are in contact with the inside surface of the bottom wall 6 of the unit case 2. The two pieces of arc walls 75 are in closure with the side ends of the two pieces of tank parts 16 and 17 formed at the lower end of the refrigerant passage pipes 15 (13). Two rows of edge parts 80 spherical in cross section are formed at the rear surface of the two pieces of arc walls 75 to protect the insulator 73 from damage. The two rows of edge parts 80 are caulked against positioning grooves 79 formed at the bottom wall 6 of the unit case 2.

These edge parts 80 is designed to position the stacked type refrigerant evaporator 3 and the drain case 4 to the unit case 2 and also to prevent air leakage at the lower end side of the stacked type refrigerant evaporator 3. Drain passages 81 are formed between the lower end of the stacked type refrigerant evaporator 3 and bottom walls 77 to drain the condensed water. Furthermore, a plurality of drain holes 82 are longitudinally arranged in parallel with each other at the two rows of bottom walls 77 to drain the condensed water to the top of the bottom wall 6 of the unit case 2.

[Mode of Operation of the Second Embodiment]

The effect of this embodiment will now be described referring to FIGS. 9 and 10. The condensed water adhered to the surfaces of the refrigerant passage pipes 15 (13) and corrugated fins 14 of the stacked type refrigerant evaporator 3 flows through the inclined ribs 22, converges at the joint walls 23 and 24, and then flows downwards. The condensed water flowed from the side ends of the tank parts 16 and 17 into the lower end sides thereof reaches the arc walls 75 of the drain case 4 before reaching the lower ends of the tank parts 16 and 17. Then, the condensed water is guided from the arc walls 75 to the bottom walls 77, to the drain holes 82, to the bottom wall 6 (insulator 73) and to the drain port 7, and then efficiently drained therefrom.

The condensed water flowed from the two pieces of tank parts 16 and 17 into the lower end sides of the tank parts 16 and 17 reaches the protruded wall 76 of the drain case 4 before reaching the lower ends of the tank parts 16 and 17. Then, the condensed water is guided from the projected wall 76 to the bottom walls 77, to the drain holes 82, to the bottom wall 6 (insulator 73) and to the drain port 7, and then efficiently drained therefrom.

[Effect of the Second Embodiment]

Figure 11:
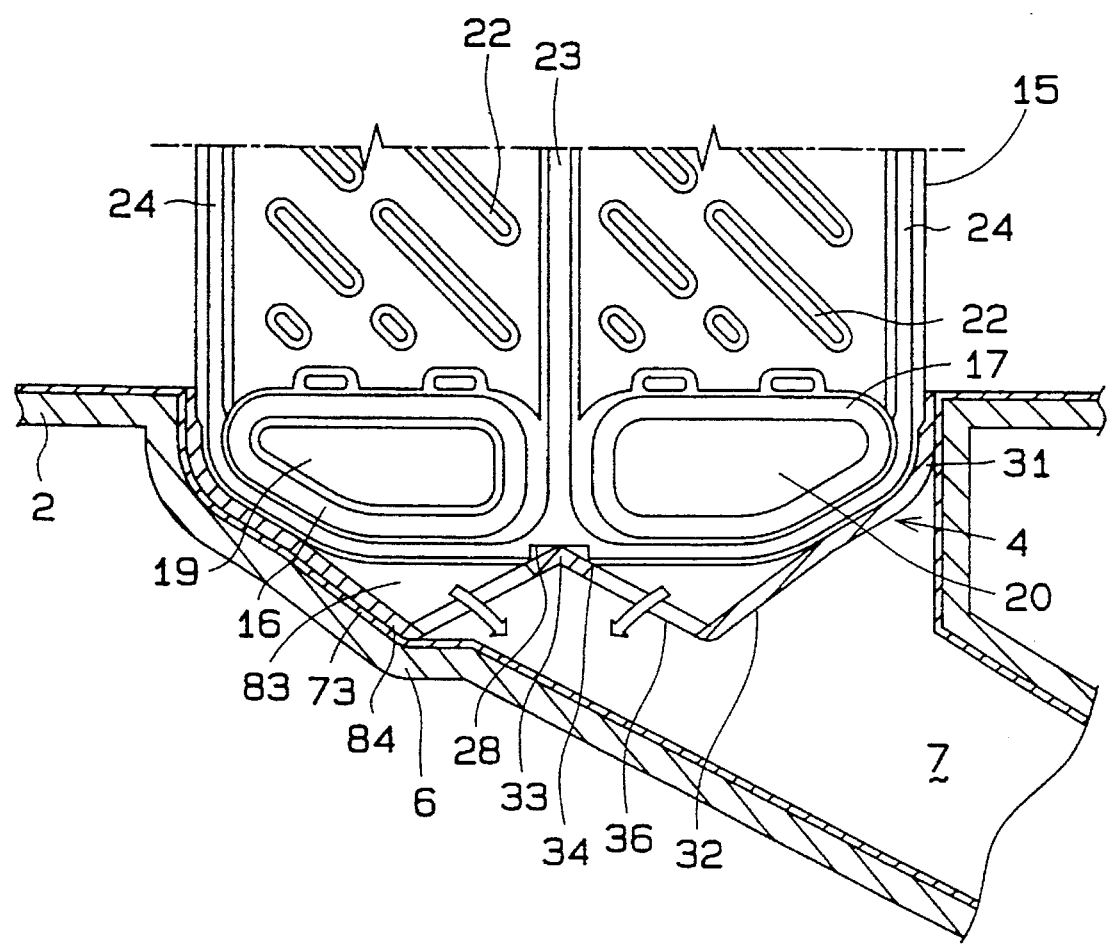
FIG. 11 is a cross-sectional view illustrating a comparative example of the second embodiment according to the present invention.

As illustrated in FIG. 11, the shape of the drain case 4 of the first embodiment requires the formation of a drain passage 83 under the stacked type refrigerant evaporator 3, This arrangement, however, may make the whole system of the cooling unit 1 bulky, and furthermore, make the insulator 73 disposed between the drain case 4 and the bottom wall 6 of the unit case 2 exposed to the danger of being damaged due to an acute-angle edge part 84.

As opposed to the above, this embodiment can protect the insulator 73 from damage or fracture by forming the edge parts 80 spherical (obtuse-angle).

Furthermore, the lower end of the presence range of the corrugated fins 14, which are to be present between the adjacent refrigerant passage pipes 15, is positioned lower than the upper end surface of the two pieces of upright walls 74 of the drain case 4 and the end surfaces of the lower walls 2a. In this arrangement, the air flowing through the unit case 2 is guided to the above side of the stacked type refrigerant evaporator 3 comparatively easily, and there is a little air which flows through a clearance between the lower end of the stacked type refrigerant evaporator 3 and the drain case 4 and leaks without being subjected to heat exchange.

[Third Embodiment]

Figure 12:
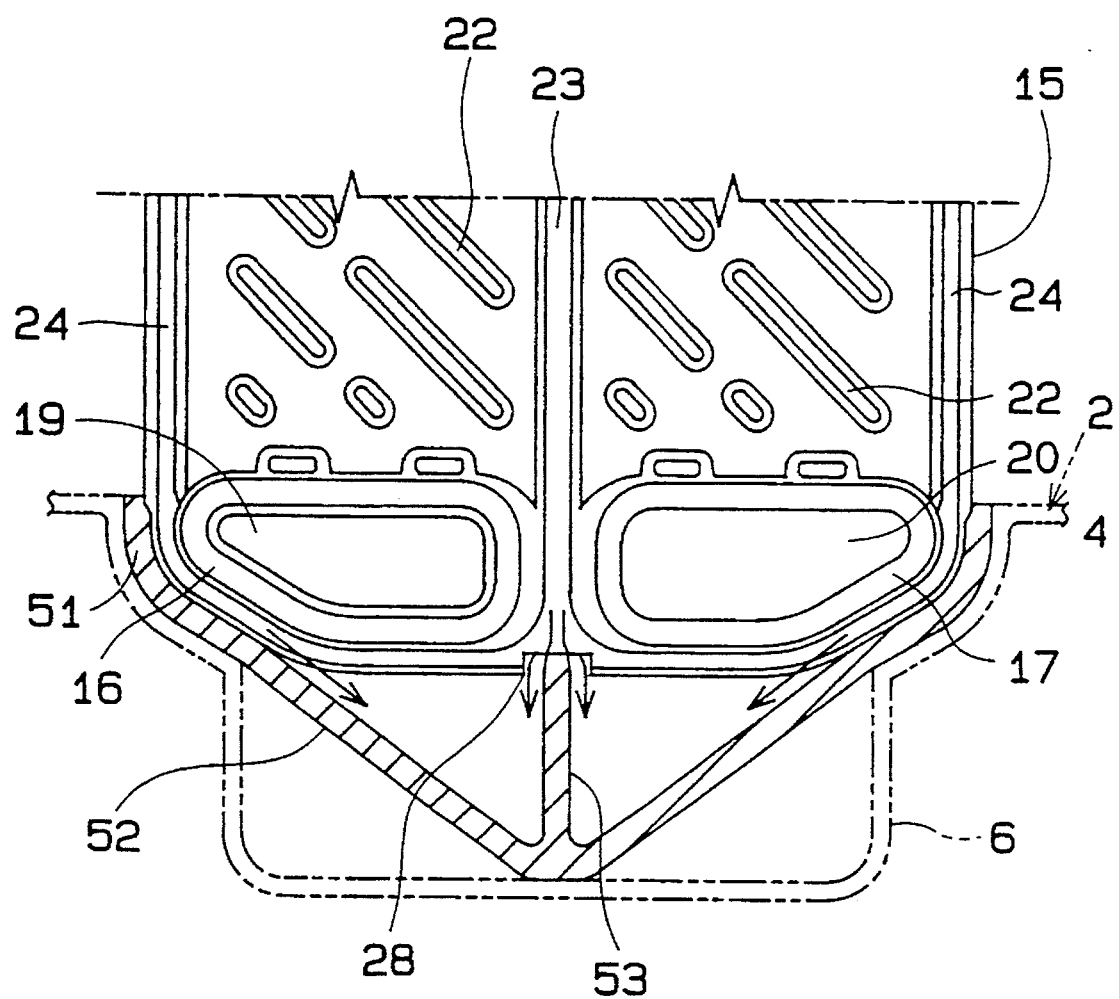
FIG. 12 is a cross-sectional view illustrating the stacked type refrigerant evaporator and drain case utilized for the third embodiment according to the present invention.

FIG. 12 illustrates the structure of the third embodiment according to the present invention, particularly the structure of the stacked type refrigerant evaporator and drain case thereof.

The drain case 4 of this embodiment comprises side wall parts 51 closing the side ends of two pieces of the tank parts 16 and 17 of the refrigerant passage pipes 15 respectively, two pieces of inclined walls 52 inclined downwards from the two pieces of side wall parts 51, and a pillar type wall 53 contacting the squarely recessed part 28 formed at the bottom end of the central part of the refrigerant passage pipes 15.

[Fourth Embodiment]

Figure 13:
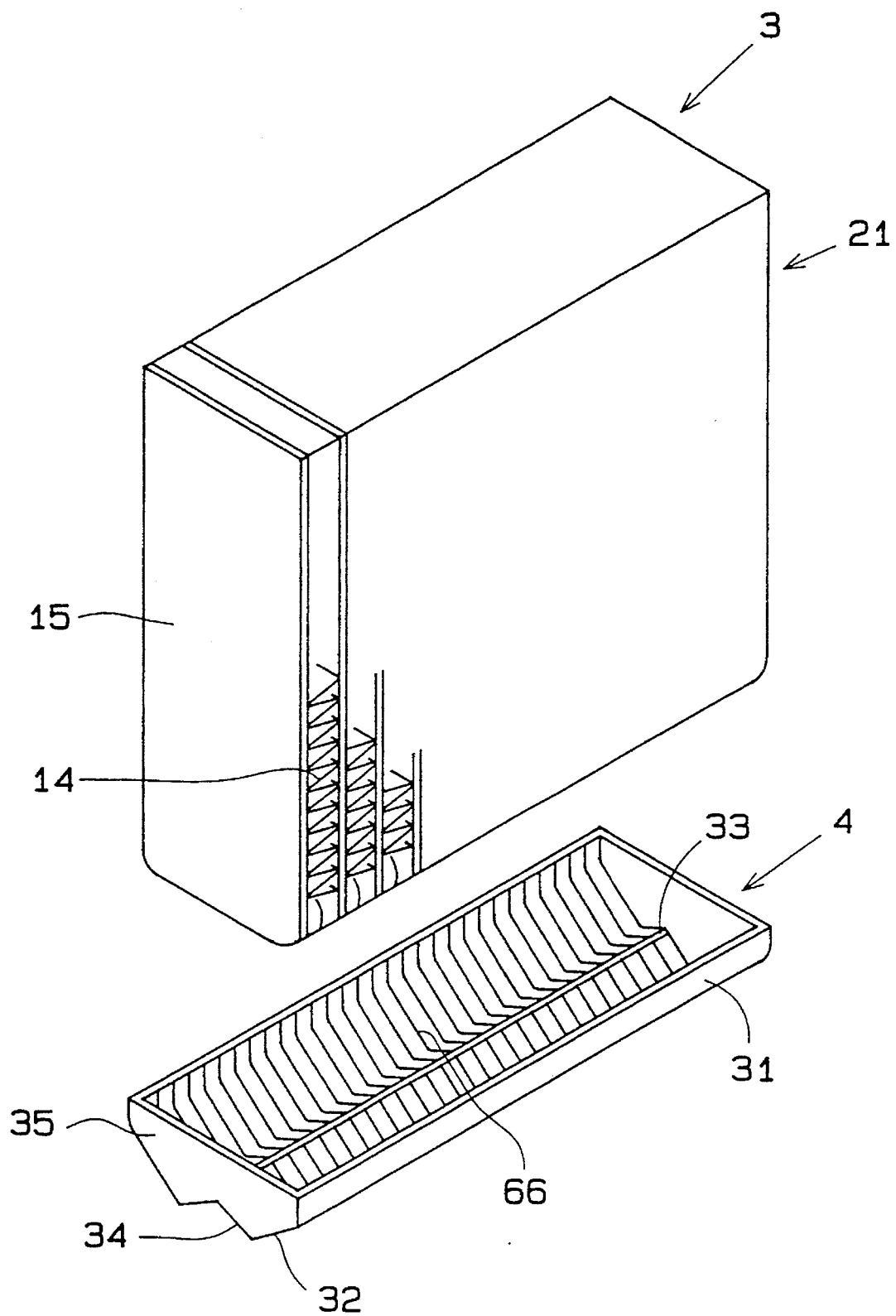
FIG. 13 is a perspective view illustrating the stacked type refrigerant evaporator and drain case utilized for the fourth embodiment according to the present invention.
Figure 14:
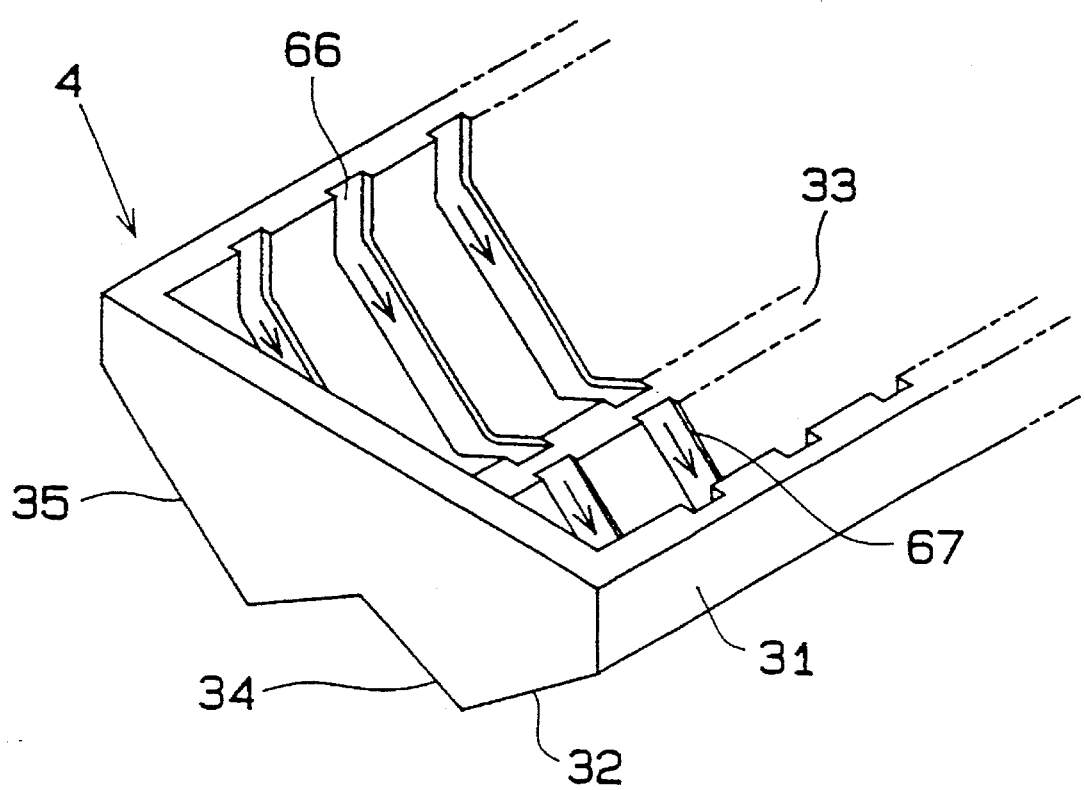
FIG. 14 is a perspective view illustrating the drain case utilized for the fourth embodiment according to the present invention.
Figure 15:
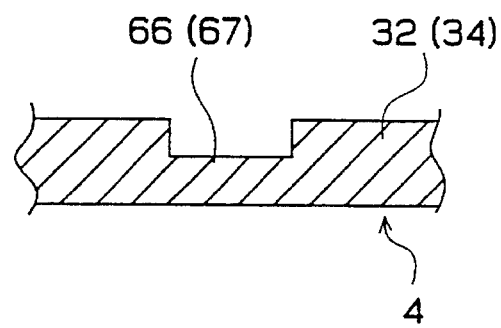
FIG. 15 is a cross-sectional view illustrating the drain case utilized for the fourth embodiment according to the present invention.

FIGS. 13 to 15 illustrate the structure of the fourth embodiment according to the present invention, whereas FIGS. 13 and 14 illustrate the stacked type refrigerant evaporator and drain case thereof.

In this embodiment, groove parts 66 and 67 are formed by machining or other means at the outside inclined walls 32 and inside inclined walls 34 of the drain case 4 to collect the condensed water dropped from the stacked type refrigerant evaporator 3. As illustrated in FIG. 15, the groove parts 66 and 67 are formed to be square in cross section.

In this embodiment, even when the refrigerant compressor is in the OFF state or the switch of the air conditioner is in the OFF state, in other words, even when there is no generation of water drops on the drain case 4, the water drops on the drain case 4 are collected into the groove parts 66 and 67. As the water drops then are generated and guided through the drain holes 36 and along the bottom wall 6 into the drain port 7, this embodiment allows more efficient draining in comparison with the first embodiment.

[Fifth Embodiment]

Figure 16:
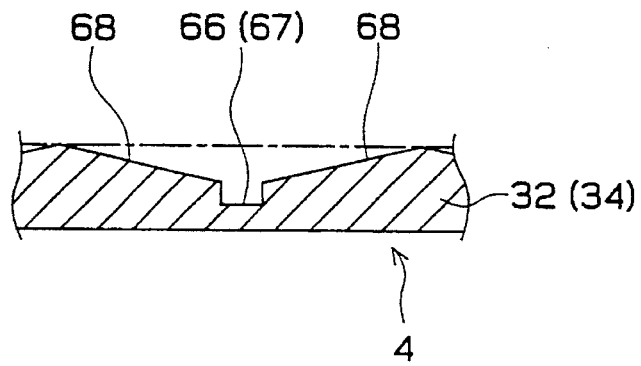
FIG. 16 is a cross-sectional view illustrating the drain case utilized for the fifth embodiment according to the present invention.

FIG. 16 illustrates the structure of the fifth embodiment according to the present invention, particularly the structure of the drain case thereof.

Gently inclined surfaces 68 are formed around the grooved parts 66 and 67 of the drain case 4 of this embodiment. In this embodiment, in comparison with the fifth embodiment, water drops over the outside inclined walls 32 and inside inclined walls 34 of a wider area of the drain case 4 can be collected into the groove parts 66 and 67.

[Sixth Embodiment]

Figure 17:
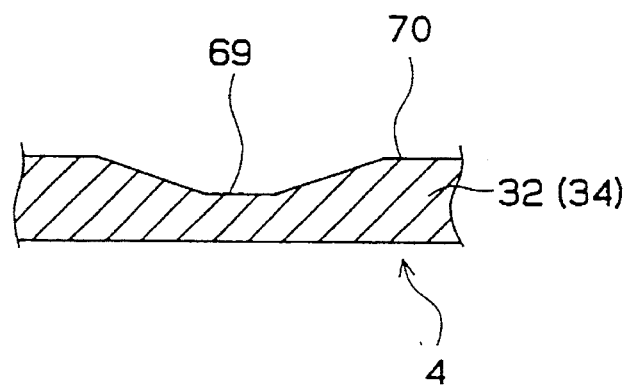
FIG. 17 is a cross-sectional view illustrating the drain case utilized for the sixth embodiment according to the present invention.

FIG. 17 illustrates the structure of the sixth embodiment according to the present invention, particularly the structure of the drain case thereof. In this embodiment, flat parts 70 and a groove part 69, which is reverse trapezoidal in cross section and disposed between the flat parts 70, are formed at the outside inclined walls 32 and inside inclined walls 34 of the drain case.

[Seventh Embodiment]

Figure 18:
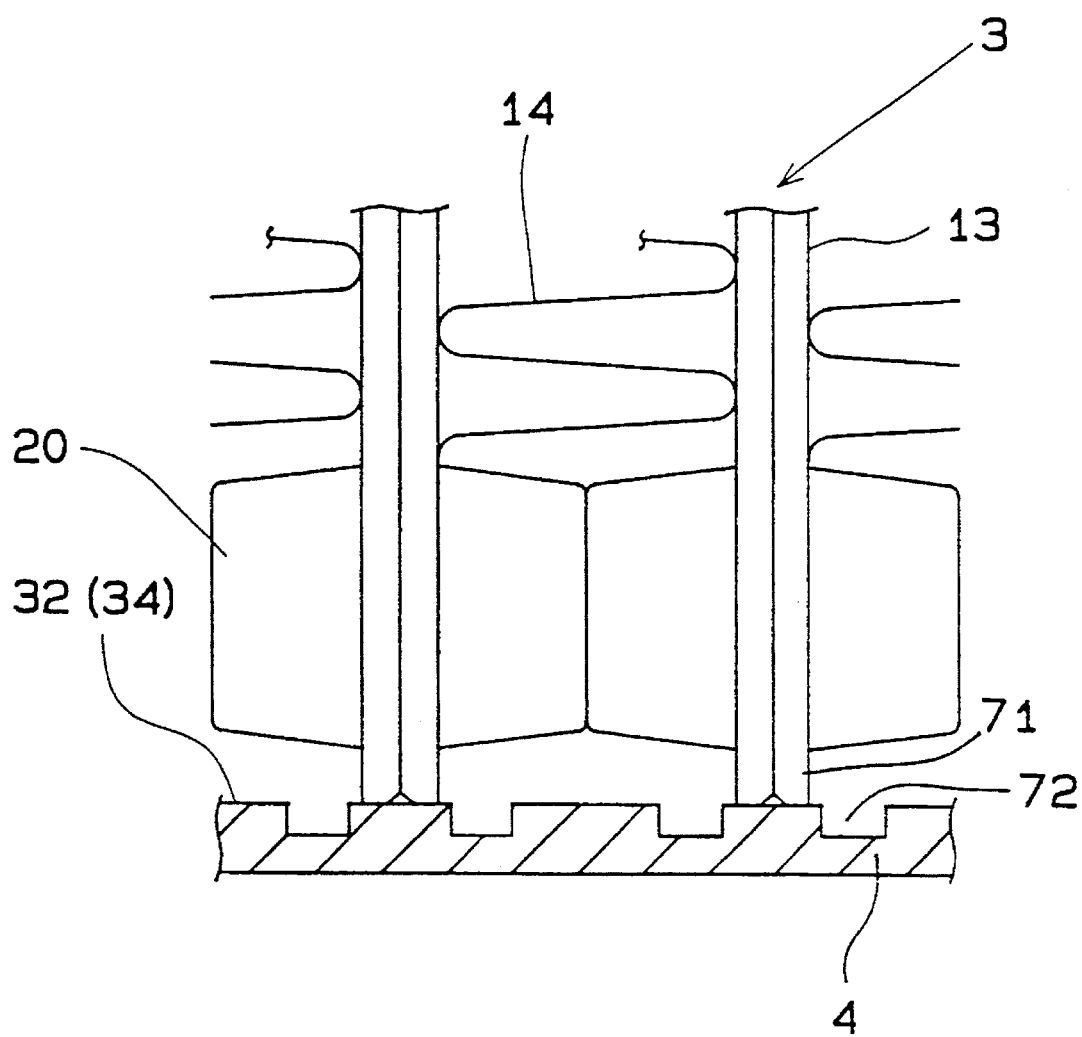
FIG. 18 is a cross-sectional view illustrating the stacked type refrigerant evaporator and drain case utilized for the seventh embodiment according to the present invention.

FIG. 18 illustrates the structure of the seventh embodiment, particularly the structure of the stacked type refrigerant evaporator and drain case thereof. In this embodiment, groove parts 72 square in cross section are formed at the outside inclined walls 32 and inside inclined walls 34 of the drain case 4 along the brim parts 71 of the refrigerant passage pipes 13 of the stacked type refrigerant evaporator 3.

[Eighth Embodiment]

Figure 19:
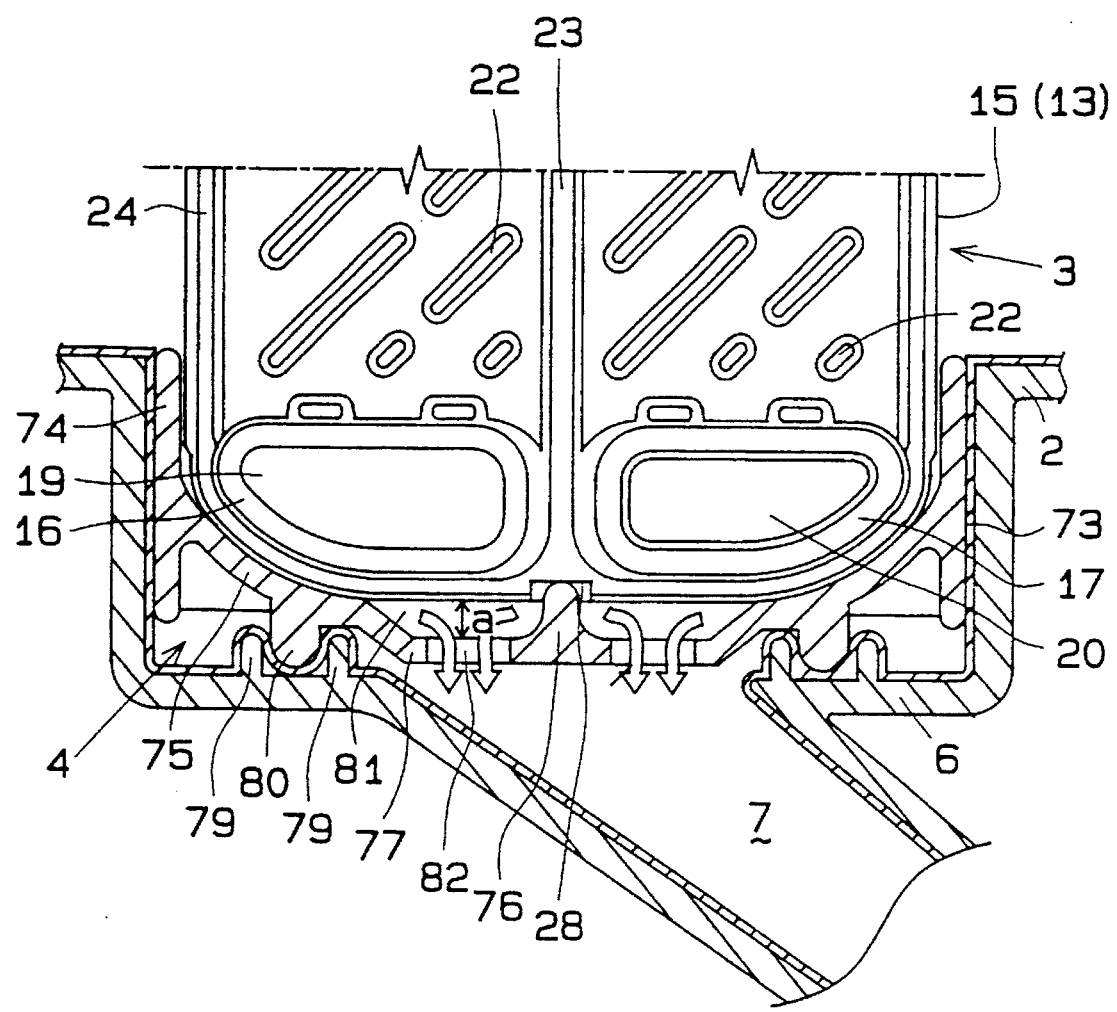
FIG. 19 is a cross-sectional view illustrating the main part of the eighth embodiment according to the present invention.
Figure 20:
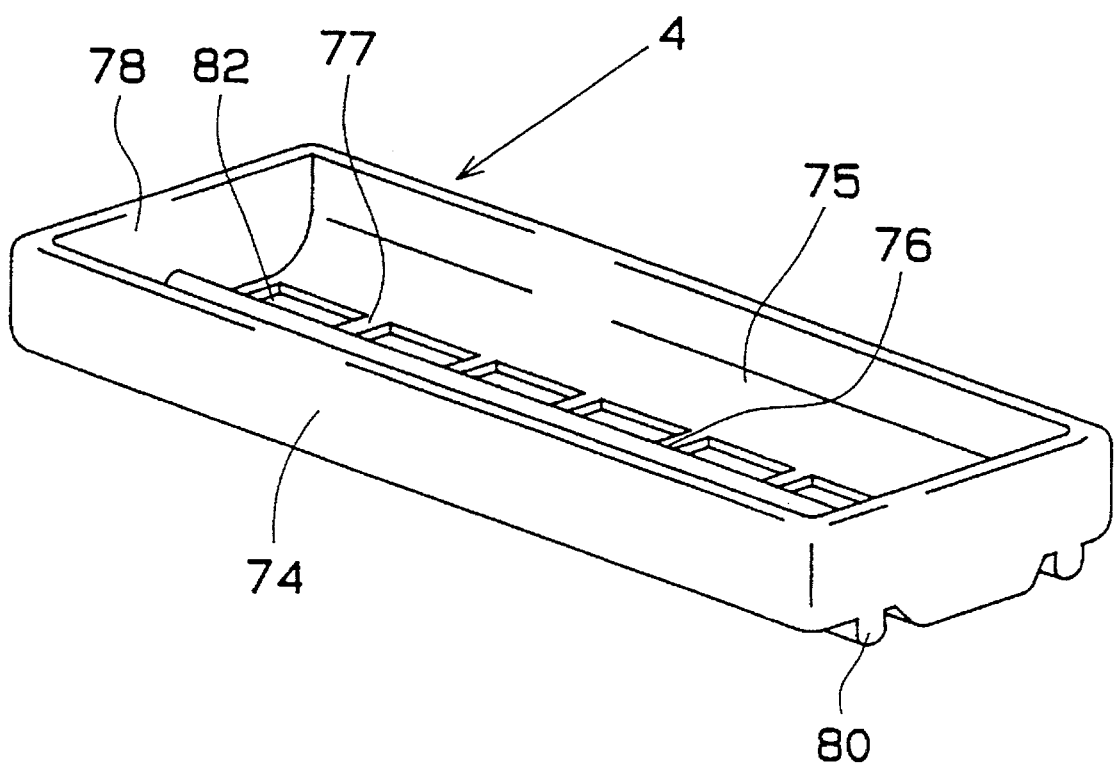
FIG. 20 is a perspective view illustrating the drain case utilized for the eighth embodiment according to the present invention.

FIGS. 19 and 20 illustrate the structure of the eighth embodiment according to the present invention, particularly the structure of the stacked type refrigerant evaporator and unit case thereof. The drain case 4 of this embodiment comprises the two pieces of upright walls 74 disposed in parallel with each other, the two pieces of arc walls 75 inclined downwards from the upright walls 74 respectively, the comparatively short projected wall 76 contacting the squarely recessed part 28 formed at the bottom end of the central part of the refrigerant passage pipes 15 (13), the two rows of bottom walls 77 connecting the arc walls 75 and the projected wall 76 respectively, and the closed walls 78 closing the width end parts of these walls 74, 75, 76 and 77.

In this embodiment, in the same way as the second embodiment, as the edge part 80 is formed spherical (obtuse-angle) in cross section, the insulator 73 is protected from damage or fracture.

Furthermore, the drain case 4 can be lowered and hence the whole body of the cooling unit 1 can be downsized by narrowing the space of the drain passages 81 provided under the stacked type refrigerant evaporator 3 without sacrificing the efficiency of draining the condensed water from the stacked type refrigerant evaporator 3. For the stacked type refrigerant evaporator provided with hydrophilic treatment, if the height of each drain passage, or a clearance a, is 3 mm or more, the condensed water will not stay between the stacked type refrigerant evaporator 3 and the drain case 4, which depends on the surface treatment agent though.

[Ninth Embodiment]

Figure 21:
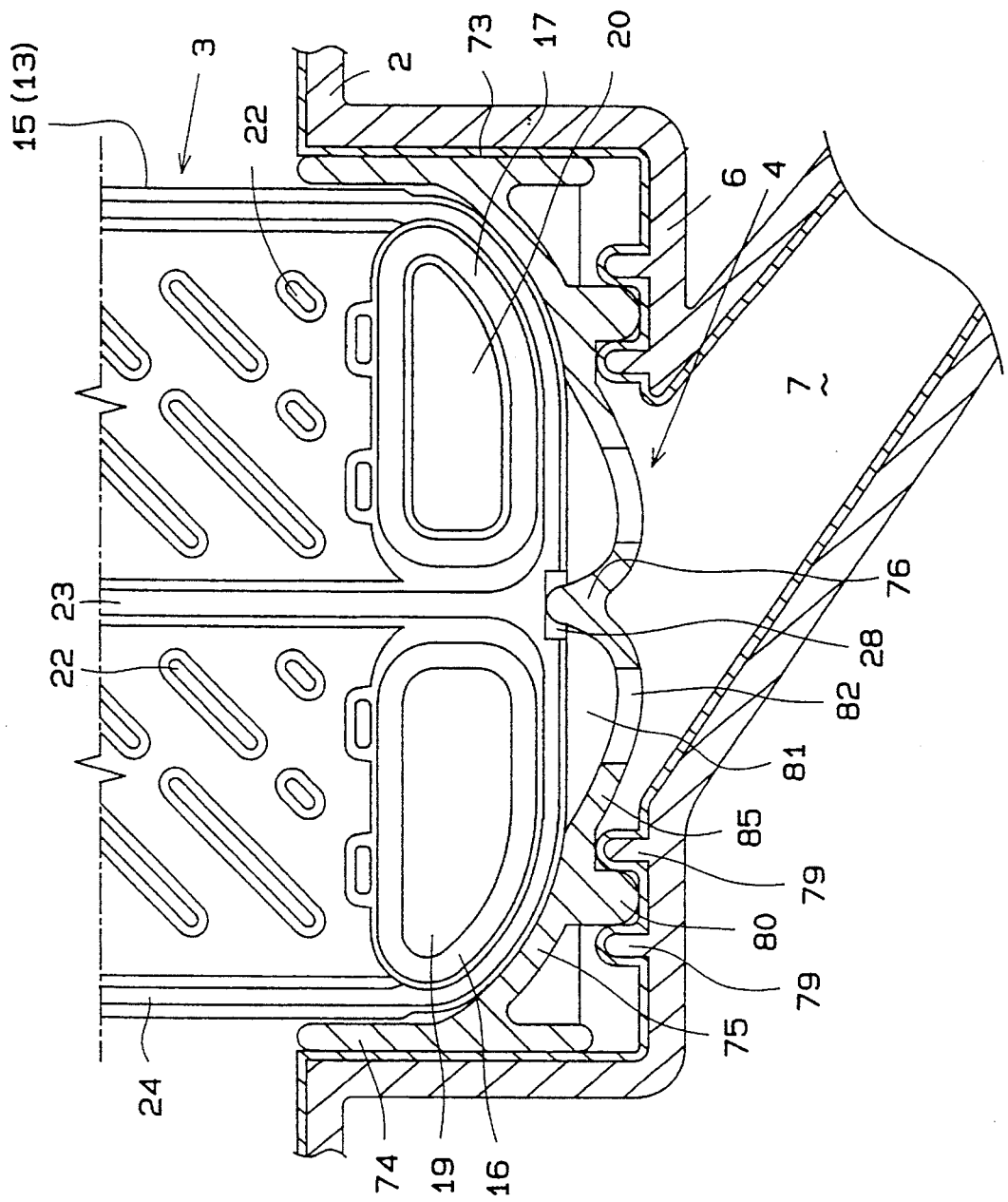
FIG. 21 is a cross-sectional view illustrating the main part of the ninth embodiment according to the present invention.

FIG. 21 illustrates the structure of the ninth embodiment according to the present invention, particularly the structure of the stacked type refrigerant and unit case thereof. Two pieces of bottom walls 85 of the drain case 4 of this embodiment have arc surfaces.

[Tenth Embodiment]

Figure 22:
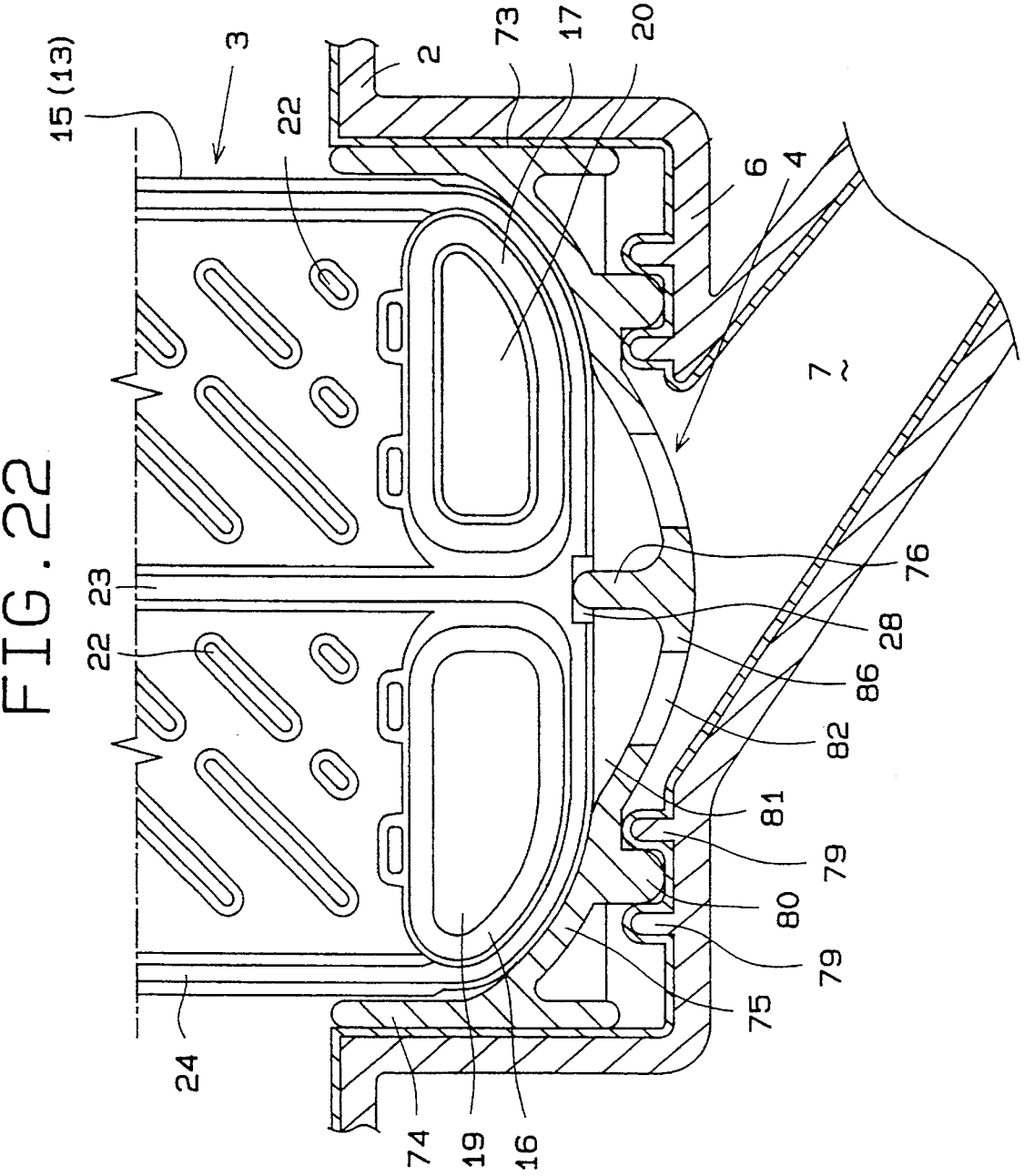
FIG. 22 is a cross-sectional view illustrating the main part of the tenth embodiment according to the present invention.

FIG. 22 illustrates the structure of the tenth embodiment according to the present invention, particularly the structure of the stacked type refrigerant and unit case thereof. A bottom wall 86 of the drain case 4 of this embodiment has an arc surface which gently connects the two pieces of arc walls 75.

[Eleventh Embodiment]

Figure 23:
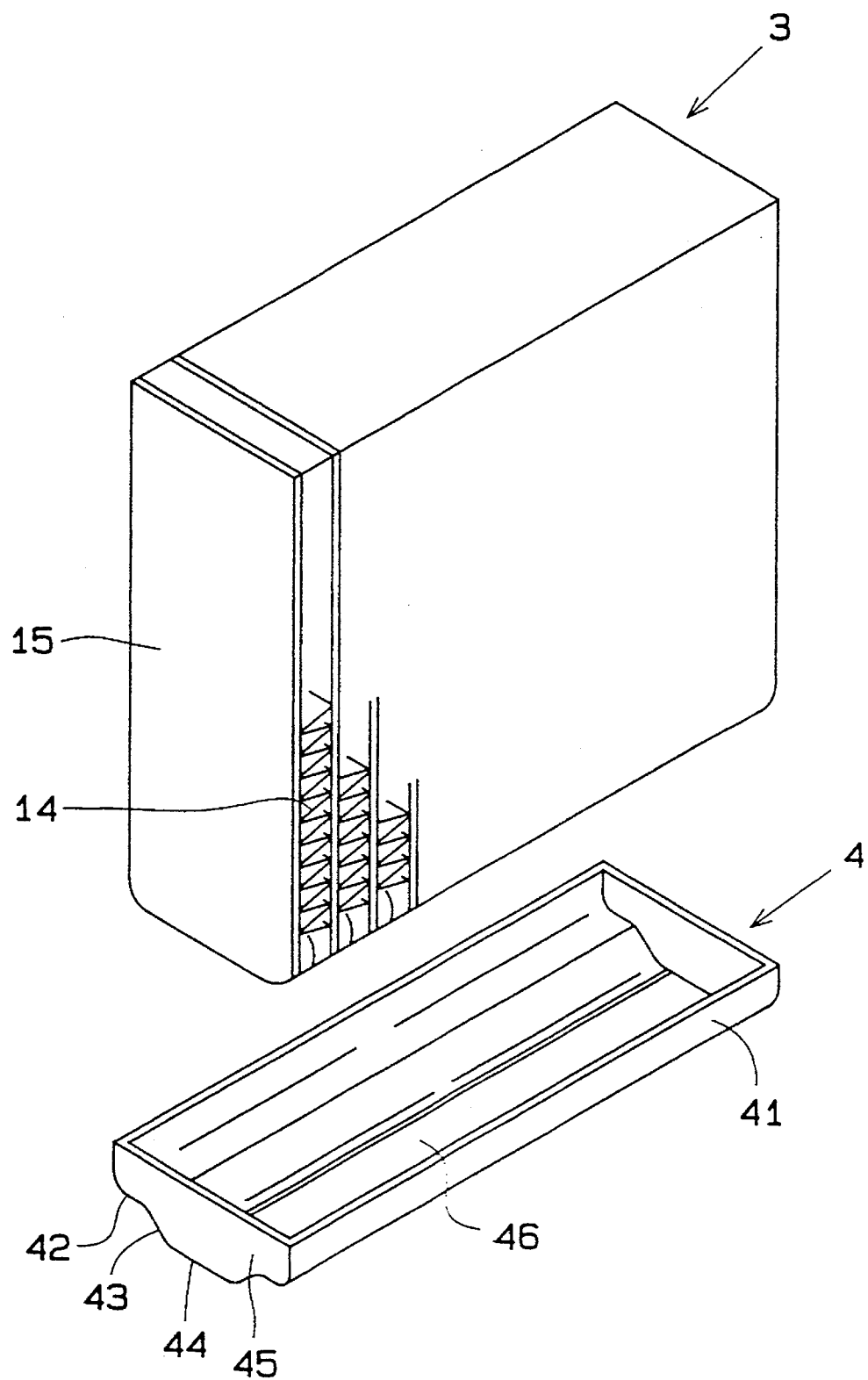
FIG. 23 is a perspective view illustrating the stacked type refrigerant evaporator and drain case utilized for the eleventh embodiment according to the present invention.
Figure 24:
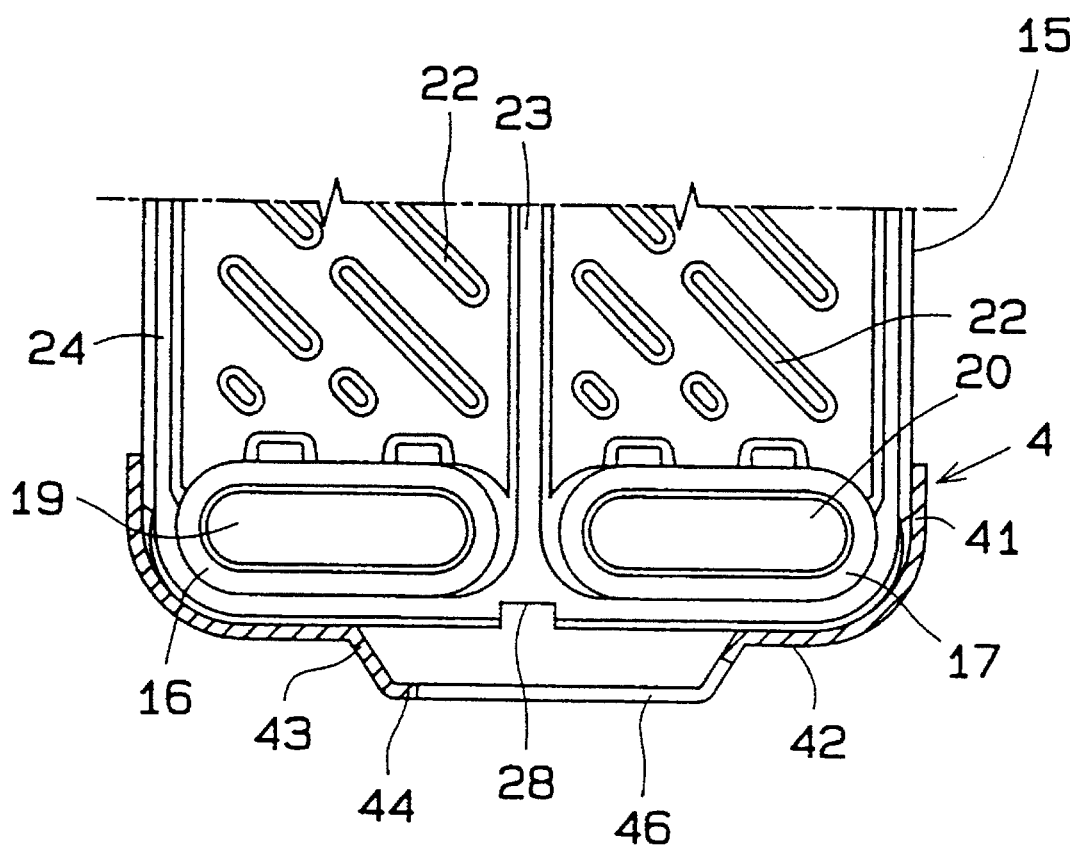
FIG. 24 is a cross-sectional view illustrating the stacked type refrigerant evaporator and drain case utilized for the eleventh embodiment according to the present invention.

FIGS. 23 and 24 illustrate the structure of the eleventh embodiment according to the present invention, particularly the structure of the stacked type refrigerant evaporator and drain case thereof.

The drain case 4 of this embodiment comprises two pieces of side walls 41 closing the side ends of the two pieces of tank parts 16 and 17 for the refrigerant passage pipes 15 respectively of the stacked type refrigerant evaporator 3, two pieces of contact wall parts 42 contacting the bottom ends of the two pieces of tank parts 16 and 17 respectively, two pieces of inclined walls 43 inclined downwards from the inside end parts of the two pieces of contact wall parts 42 respectively, a bottom wall part 44 separated by the specified distance from the bottom end of the refrigerant passage pipes 15, and two pieces of closing walls 45 closing the width end parts of these walls 42, 43 and 44. The inclined wall parts 43 and the bottom wall part 44 include a drain hole 46 to drain the condensed water to the top of the bottom wall 6 of the unit case 1.

In this embodiment, as illustrated in FIG. 24, the condensed water flowed from the side ends of the tank parts 16 and 17 into the lower end side thereof reaches from the lower ends of the tank parts 16 and 17 to the contact wall parts 42, and is guided to the inclined wall parts 43, to the bottom wall part 44, to the drain hole 46 and to the drain port 7, and then drained therefrom.

The condensed water flowed from between the two pieces of tank parts 16 and 17 to the lower sides of the tank parts 16 and 17 joins the condensed water from the side ends flowed along the contact wall parts 42 of the drain case 4 before reaching the lower ends of the tank parts 16 and 17, and then flows into the inclined wall parts 43.

[Twelfth Embodiment]

Figure 25:
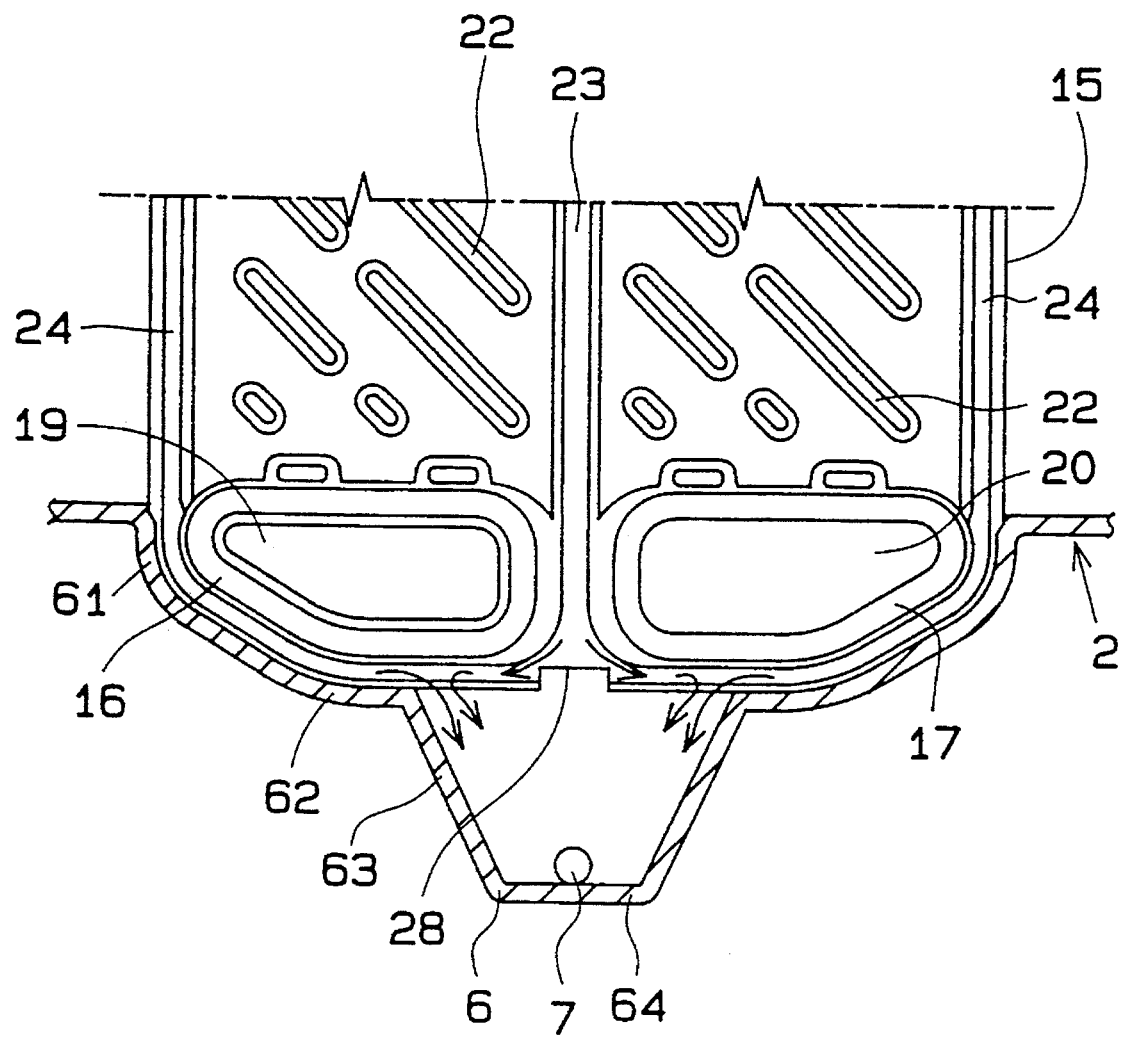
FIG. 25 is a cross-sectional view illustrating the stacked type refrigerant evaporator and unit case utilized for the twelfth embodiment according to the present invention.
Figure 26:
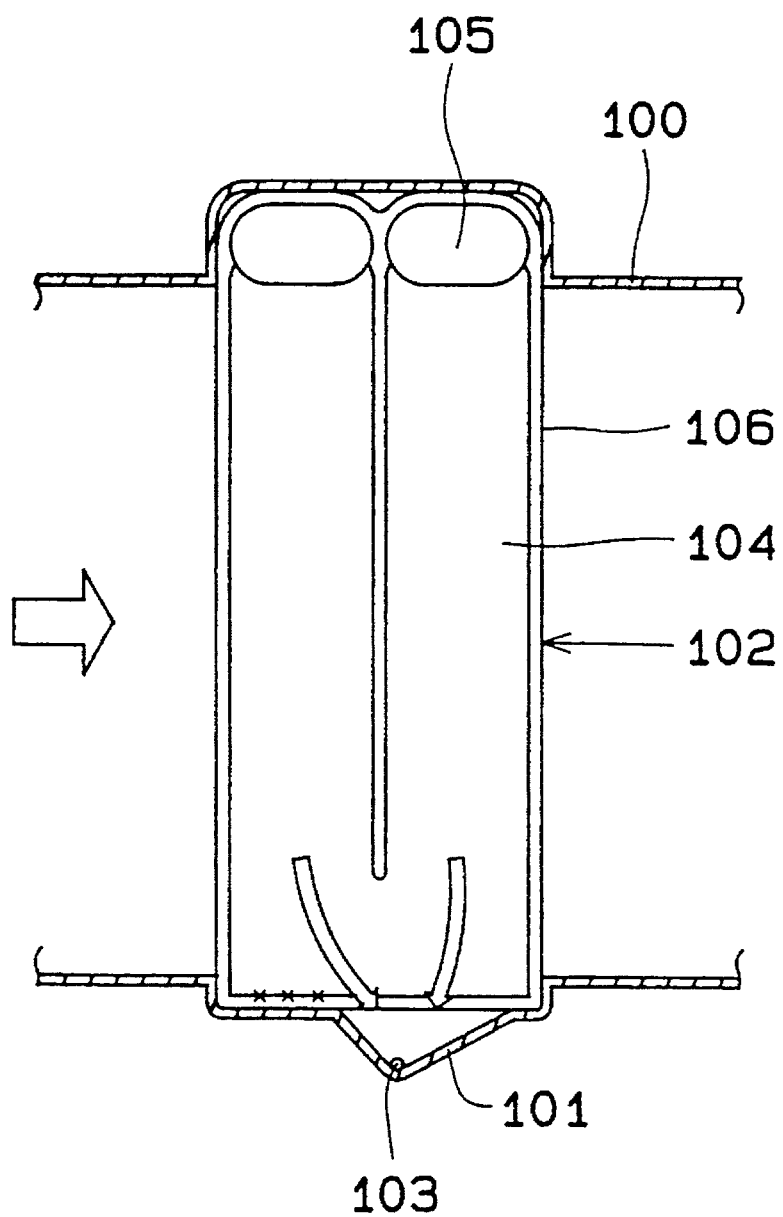
FIG. 26 is a cross-sectional view of a cooling unit for air conditioners utilizing a refrigerant evaporator of a conventional type with tanks mounted on top.
Figure 27:
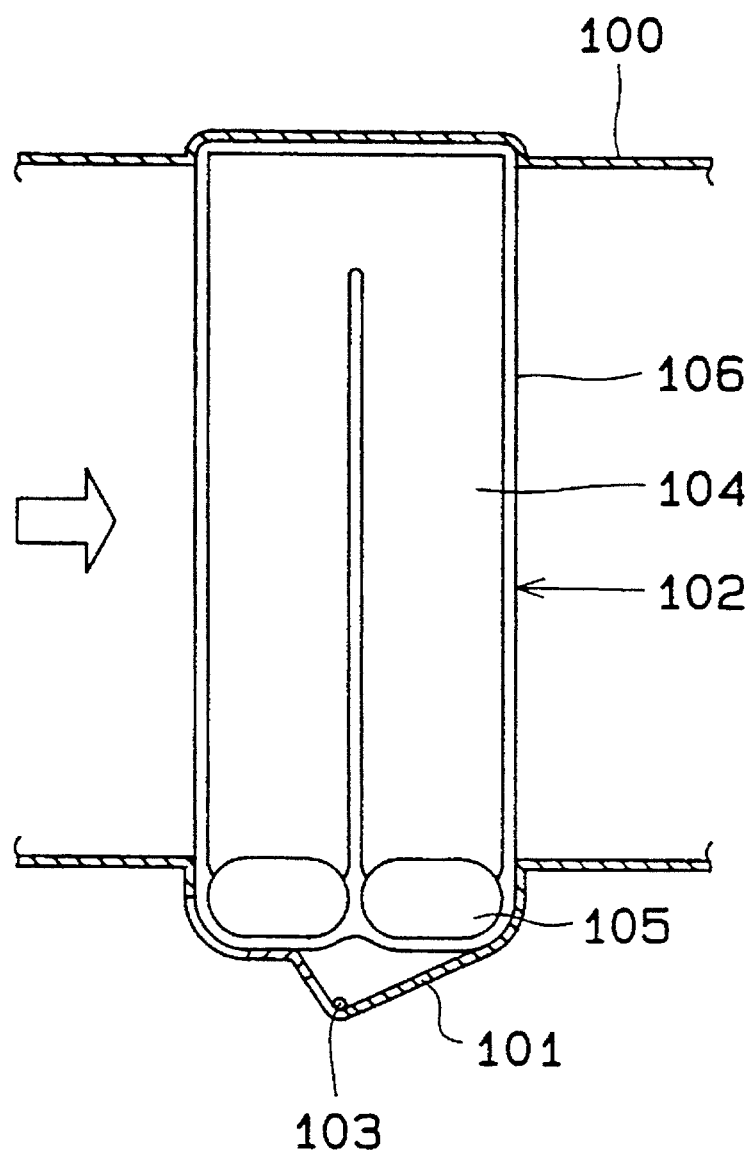
FIG. 27 is a cross-sectional view of a cooling unit for air conditioners utilizing a refrigerant evaporator of a conventional type with tanks mounted at the bottom.
Figure 28:
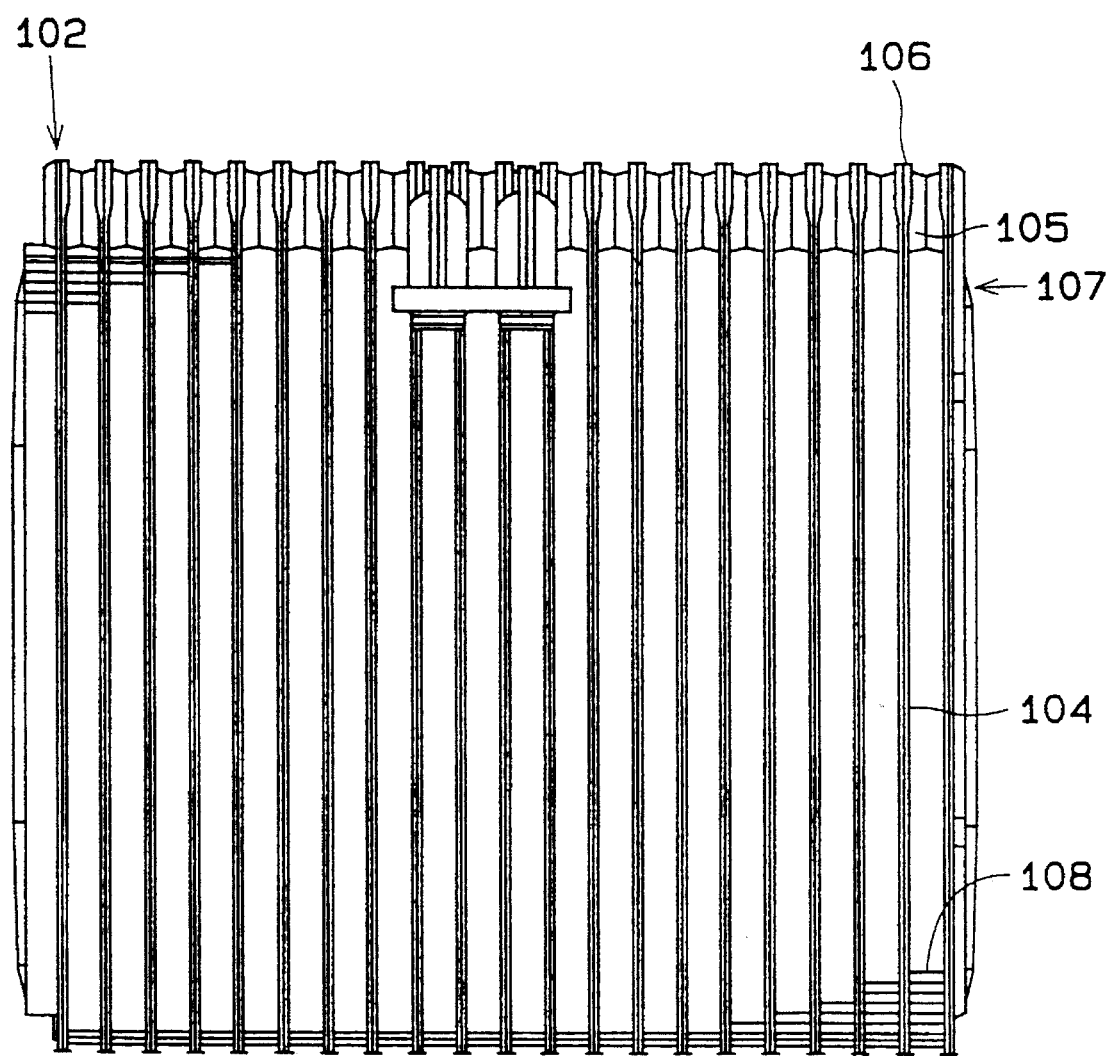
FIG. 28 is a front view illustrating a conventional single-tank and stacked type refrigerant evaporator.
Figure 29:
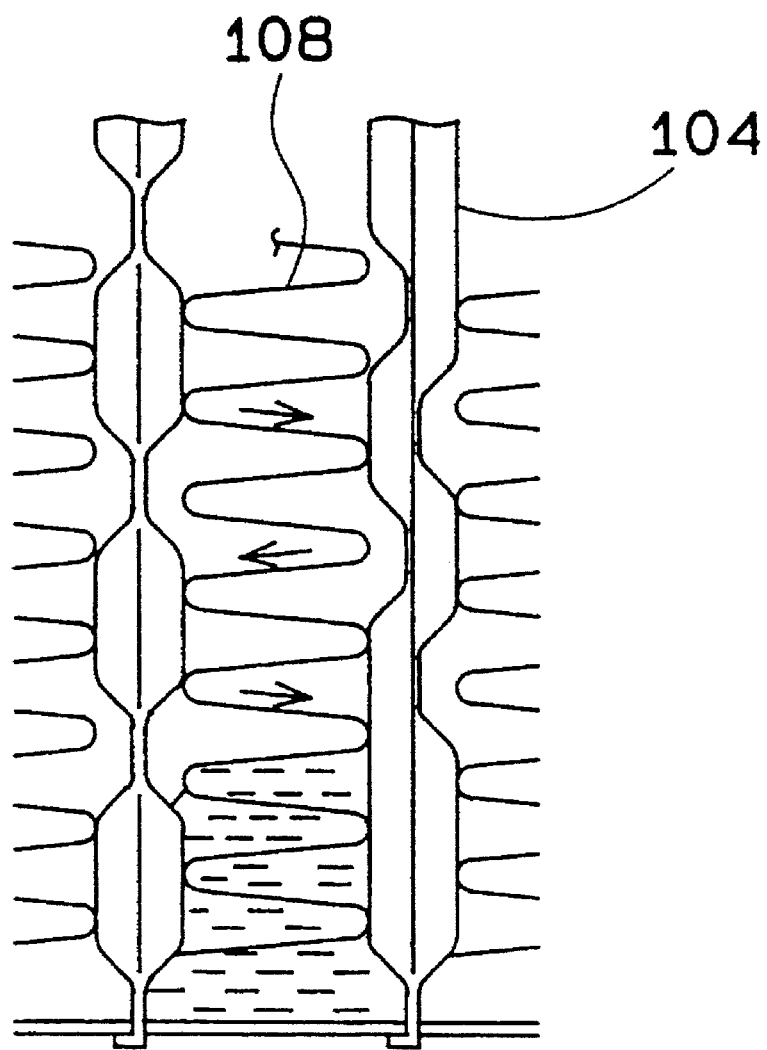
FIG. 29 is an illustrative view illustrating the principle of draining the condensed water in a conventional type.
Figure 30:
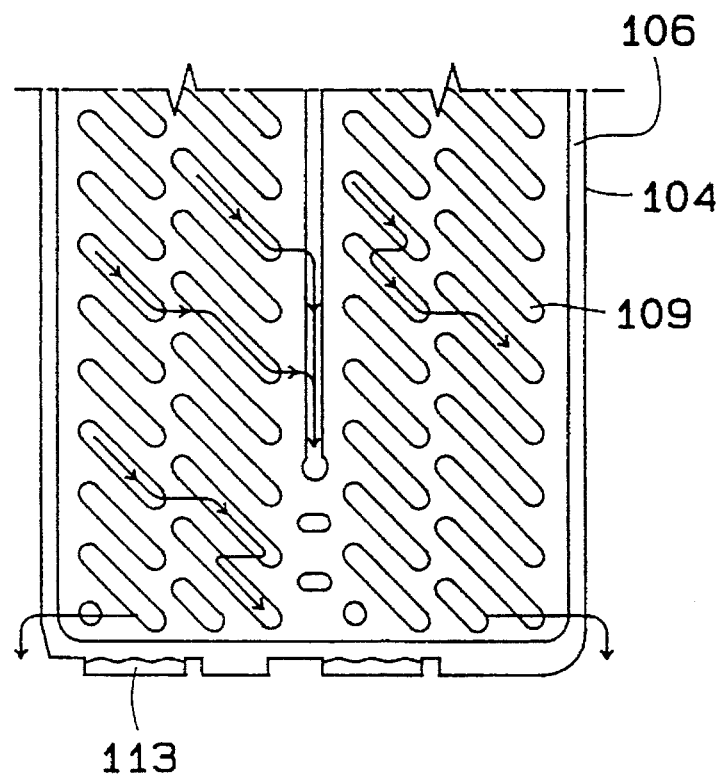
FIG. 30 is an illustrative view illustrating the principle of draining the condensed water in a conventional type.
Figure 31:
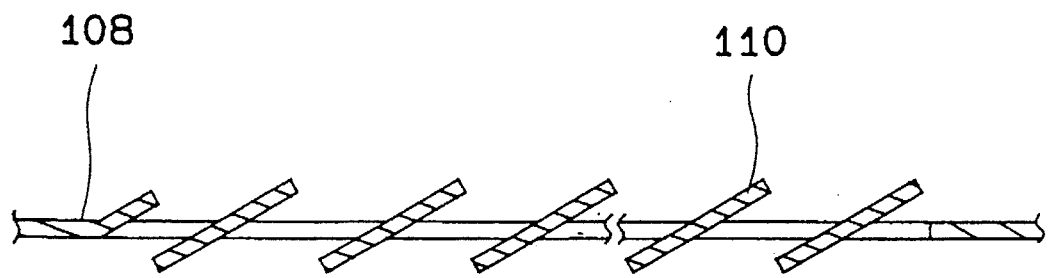
FIG. 31 is a cross-sectional view of louvers for fins in a conventional type.
Figure 32:
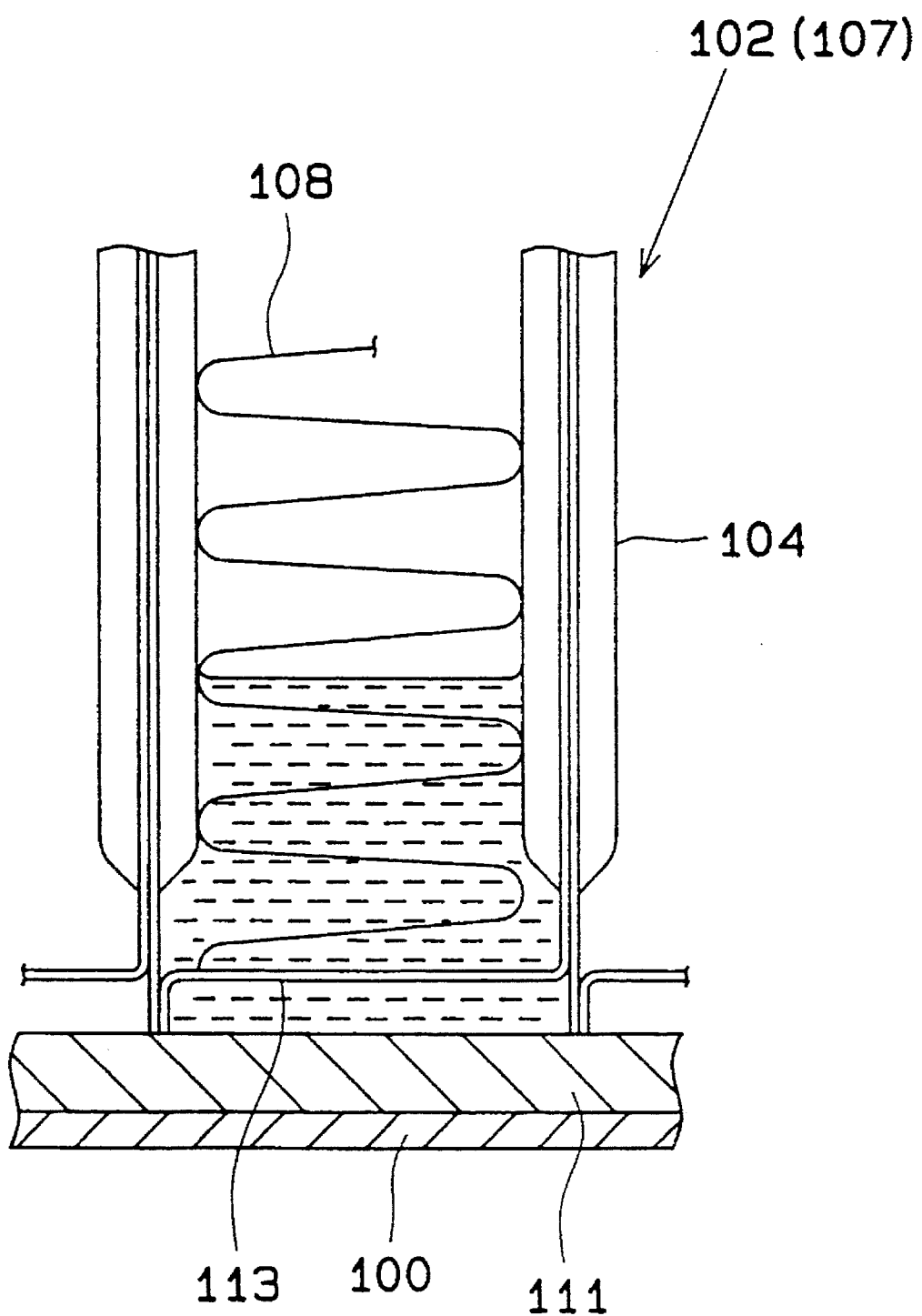
FIG. 32 is an illustrative view illustrating the part where the condensed water stays in refrigerant passage pipes of a conventional refrigerant evaporator with tanks mounted on top.
Figure 33:
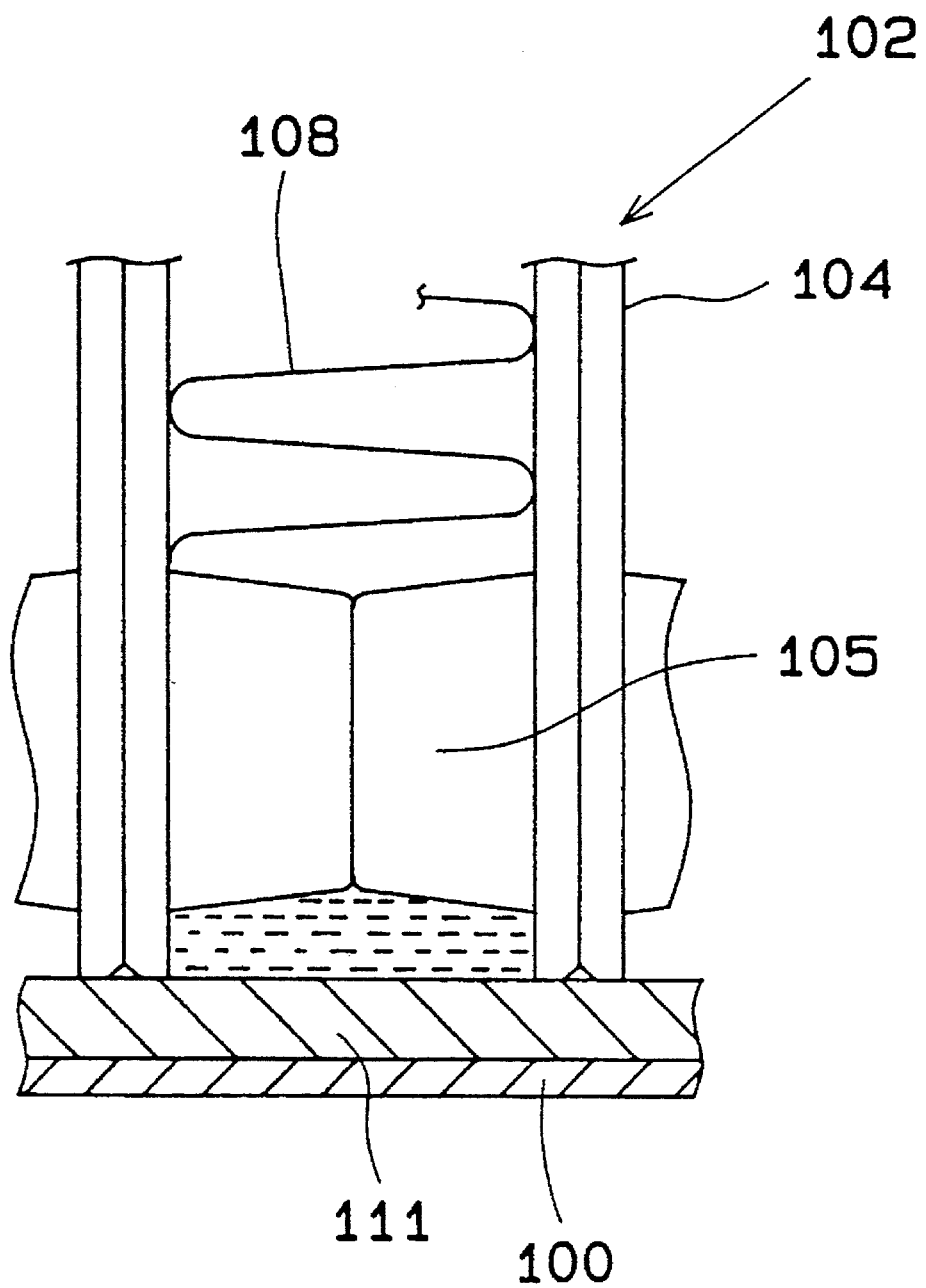
FIG. 33 is an illustrative view illustrating the part where the condensed water stays in refrigerant passage pipes of a conventional refrigerant evaporator with tanks mounted at the bottom.
Figure 34:
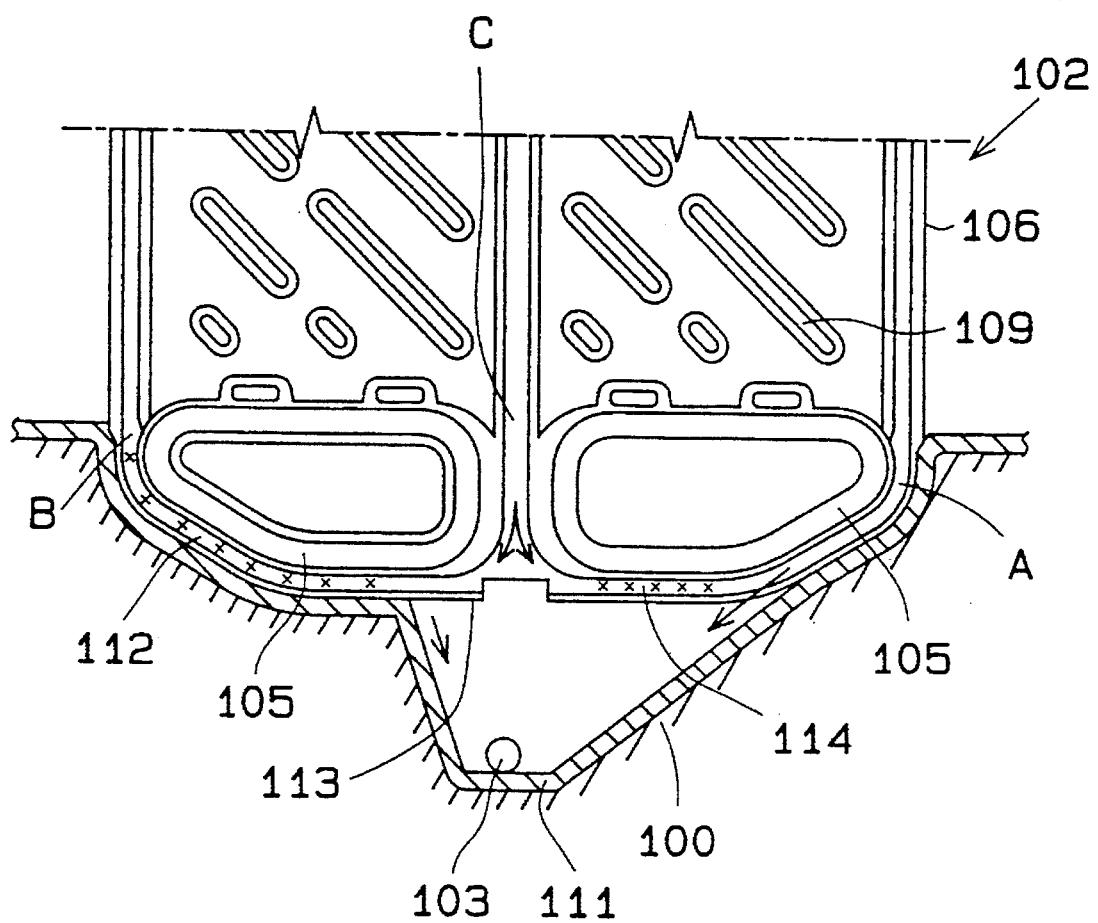
FIG. 34 is an illustrative view illustrating the part where the condensed water stays in refrigerant passage pipes of a conventional refrigerant evaporator with tanks mounted at the bottom.

FIG. 25 illustrates the structure of the twelfth embodiment according to the present invention, particularly the structure of the stacked type refrigerant evaporator and unit case thereof.

In this embodiment, the bottom wall 6 of the unit case 2 is so transformed not to allow the condensed water to stay at the lower ends of the refrigerant passage pipes 15. The bottom wall 6 of the unit case 2 comprises two pieces of arc side wall parts 61 closing the side ends of the two pieces of tank parts 16 and 17 respectively of the refrigerant passage pipes 15, two pieces of contact wall parts 62 contacting the bottom ends of the two pieces of tank parts 16 and 17 from the two pieces of side wall parts 61, two pieces of inclined wall parts 63 inclined downwards from the inside end part of these contact wall parts 62, and a bottom wall part 64 separated by the specified distance from the bottom end of the refrigerant passage pipes 15 and connecting the bottom ends of these inclined wall parts 63.

[Modified embodiment]

In this embodiment, the present invention is applied to the stacked type refrigerant evaporator 3 with the two pieces of tank parts 16 and 17 formed at the lower end side of the refrigerant passage pipes 15. The present invention, however, may be applied to a refrigerant evaporator with three or more pieces of tank parts formed at the lower end of the refrigerant passage pipes. Alternatively, the present invention may also be applied to a refrigerant evaporator with a tank part formed on the upper end part of the refrigerant passage pipes, as well as at the lower end of the refrigerant passage pipes.

What is claimed is:

1. A cooling unit for air conditioners, comprising:

a refrigerant evaporator composed of a plurality of stacked refrigerant passage pipes with at least two tank parts formed at a lower end side thereof and with fins disposed between adjacent refrigerant passage pipes, said evaporator having a lower end part defining a bottom of said evaporator, a windward side end part defining a windward side disposed adjacent said bottom of said evaporator and a leeward side end part defining a leeward side disposed adjacent said bottom of said evaporator; and a drain case having a drain hole for receiving condensed water generated in said evaporator, said drain case including:

a windward side inclined part disposed under said evaporator and contacting said windward side end part of said tank part at the windward side and extending downwardly towards a center of said evaporator;

a lee side inclined part disposed under said refrigerant evaporator and contacting said leeward side end part of said tank part at the lee side and extending downwardly towards the center of said evaporator; and a protruded part formed continuously with said windward and lee side inclined parts and contacting said lower end part between adjacent said two tank parts of said evaporator.

2. The cooling unit for air conditioners according to claim 1, wherein said windward and lee side inclined parts include two pieces of side wall parts contacting said windward and lee side end parts and two pieces of outside inclined wall inclined downwardly from said side wall parts, said protruded part being a chevron type protruded wall contacting said lower end part of said evaporator; and two pieces of inside inclined walls connecting said two pieces of outside inclined walls and said protruded walls.

3. The cooling unit for air conditioners according to claim 2, wherein said drain hole is made at said inside inclined walls.

4. The cooling unit for air conditioners according to claim 1, wherein said windward side inclined part and said lee side inclined part are integrally connected and have a wall from a connecting part of said inclined parts and contacting said lower end part of said evaporator.

5. The cooling unit for air conditioners according to claim 1, wherein said windward side inclined part and said lee side inclined part are extending straight and downwardly to the center of the evaporator and are integrally connected with each other at a bottom part which is separated from said lower end part of said evaporator by a specified distance, said windward side inclined part and said lee side inclined part having:

a wall extending upwardly from the center of said bottom part and contacting the lower end part of said evaporator.

6. The cooling unit for air conditioners according to claim 4, wherein said drain hole is made at said windward side inclined part and said lee side inclined part.

7. The cooling unit for air conditioners according to claim 6, wherein said refrigerant passage pipes and said fins of said refrigerant evaporator are provided with hydrophilic treatment.

8. The cooling unit for air conditioners according to claim 7, wherein a bottom end of said fins formed between adjacent said refrigerant passage pipes is under an upper end of said drain case.

9. The cooling unit for air conditioners according to claim 7, wherein said drain case is disposed between the lower end of said refrigerant evaporator and a bottom wall of a unit case and said unit case includes an engagement part for positioning said drain case.

10. A drain case disposed under a refrigerant evaporator, comprising;

plural pairs of stacked plates with at least two pieces of tank parts formed at a lower end part of said evaporator;

a windward side inclined part contacting a windward side end part of said evaporator;

a lee side inclined part contacting a lee side end part of said evaporator;

a protruded part contacting the lower end part of said evaporator and between said two pieces of tank parts; and a drain hole for draining condensed water generated by said evaporator, wherein said windward and lee side inclined parts and said protruded part are formed integrally.

11. The cooling unit for air conditioners according to claim 1, wherein the number of said tank parts are two.

12. The cooling unit for air conditioners according to claim 1, wherein said windward side inclined part has an arc shape and said lee side inclined part has an arc shape, said two arc shapes are connected at said protruded part.

13. The cooling unit for air conditioners according to claim 1, wherein said windward side inclined part and said lee side inclined part form an arc shape, said protruded part is disposed at the center of said arc shape.

* * * * *